US011727263B2

(12) United States Patent
Lee et al.

(10) Patent No.: US 11,727,263 B2
(45) Date of Patent: Aug. 15, 2023

(54) METHOD OF UPDATING SENTENCE GENERATION MODEL AND SENTENCE GENERATING APPARATUS

(71) Applicant: Samsung Electronics Co., Ltd., Suwon-si (KR)

(72) Inventors: Hoshik Lee, Seongnam-si (KR); Hwidong Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1456 days.

(21) Appl. No.: 16/014,779

(22) Filed: Jun. 21, 2018

(65) Prior Publication Data

US 2019/0114540 A1    Apr. 18, 2019

(30) Foreign Application Priority Data

Oct. 16, 2017    (KR) .................. 10-2017-0133971

(51) Int. Cl.
| | |
|---|---|
| *G06N 3/08* | (2023.01) |
| *G06F 17/18* | (2006.01) |
| *G10L 15/16* | (2006.01) |
| *G06F 40/44* | (2020.01) |
| *G06F 40/51* | (2020.01) |
| *G06N 3/045* | (2023.01) |

(52) U.S. Cl.
CPC .............. *G06N 3/08* (2013.01); *G06F 17/18* (2013.01); *G06F 40/44* (2020.01); *G06F 40/51* (2020.01); *G06N 3/045* (2023.01); *G10L 15/16* (2013.01)

(58) Field of Classification Search
CPC ........ G06N 3/08; G06N 3/0454; G06F 40/51; G06F 40/44; G06F 17/18
See application file for complete search history.

(56) References Cited

U.S. PATENT DOCUMENTS

| | | | |
|---|---|---|---|
| 11,068,660 B2* | 7/2021 | Al Hasan | ............. G06N 3/0454 |
| 2010/0179803 A1 | 7/2010 | Sawaf et al. | |
| 2016/0210551 A1 | 7/2016 | Lee et al. | |
| 2018/0329987 A1* | 11/2018 | Tata | ...................... G06F 40/131 |

FOREIGN PATENT DOCUMENTS

| | | |
|---|---|---|
| JP | 2005-78318 A | 3/2005 |
| KR | 10-2016-0085100 A | 7/2016 |

OTHER PUBLICATIONS

Hendricks et al., "Generating Visual Explanations", Sep. 17, 2016, ECCV 2016, Part IV, LNCS 9908, pp. 3-19. (Year: 2016).*

(Continued)

*Primary Examiner* — Ying Yu Chen
(74) *Attorney, Agent, or Firm* — NSIP Law

(57) ABSTRACT

A processor implemented method to update a sentence generation model includes: generating a target sentence corresponding to a source sentence using a first decoding model; calculating reward information associated with the target sentence using a second decoding model configured to generate a sentence in an order different from an order of the sentence generated by the first decoding model; and generating an updated sentence generation model by resetting a weight of respective nodes in the first decoding model based on the calculated reward information.

27 Claims, 12 Drawing Sheets

(56) References Cited

OTHER PUBLICATIONS

Yu et al., "SeqGAN: Sequence Generative Adversarial Nets with Policy Gradient", Feb. 13, 2017, Proceedings of the Thirty-First AAAI Conference on Artificial Intelligence (AAAI-17), 31(1), pp. 2852-2858. (Year: 2017).*
Bahdanau et al., "An Actor-Critic Algorithm for Sequence Prediction", Mar. 3, 2017, arXiv:1607.07086v3, pp. 1-17. (Year: 2017).*
Ren et al., "Deep Reinforcement Learning-based Image Captioning with Embedding Reward", Apr. 12, 2017, arXiv:1704.03899v1, pp. 1-9. (Year: 2017).*
Sato, et al. "Text classification and transfer learning based on character-level deep convolutional neural networks." *International Conference on Agents and Artificial Intelligence*. Springer, Cham, Jun. 21, 2018. pp. 62-81.
Japanese Notice of Preliminary Rejection Action dated Nov. 9, 2021 in corresponding Japanese Patent Application No. 2018-148375. (3 pages in English and 6 pages in Japanese).
Deyi Xiong, et al., "Backward and trigger-based language models for statistical machine translation," *Natural Language Engineering—Cambridge University Press*, vol. 21, Issue 2, Jul. 2013, pp. 201-226.
Di He, et al., "Dual Learning for Machine Translation," *Proceedings of the Neural Information Processing Systems (NIPS) Conference*, Barcelona, Spain, Dec. 2016 (9 pages, in English).
Lantao Yu, et al., "SeqGAN: Sequence Generative Adversarial Nets with Policy Gradient," *Proceedings of the 31st AAAI Conference on Artificial Intelligence (AAAI-17)*, San Francisco, California, Feb. 2017 (7 pages, in English).
Zhen Yang, et al., "Improving Neural Machine Translation with Conditional Sequence Generative Adversarial Nets," *Computation and Language (cs.CL)*, *Cornell University Library—arXiv:1703.04887*, Mar. 2017 (10 pages, in English).
Ill Daumé, Hal et al., "Search-based Structured Prediction", *Machine learning*, vol. 75, Issue 3, Jul. 4, 2009 (pp. 297-325).
Bahdanau, Dzmitry, et al., "Neural Machine Translation by Jointly Learning to Align and Translate", *arXiv preprint arXiv:1409.0473*, Oct. 7, 2014 (15 pages in English).
Ranzato, Marc'Aurelio, et al. "Sequence Level Training with Recurrent Neural Networks", *arXiv preprint arXiv:1511.06732*, May 6, 2015 (16 pages in English).
Liu, Lemao, et al. "Agreement on Target-bidirectional Neural Machine Translation", *Proceedings of the 2016 Conference of the North American Chapter of the Association for Computational Linguistics: Human Language Technologies*, Jun. 17, 2016 (6 pages in English).
Sennrich, Rico, et al., "Edinburgh Neural Machine Translation Systems for WMT 16", *arXiv preprint arXiv:1606.02891, Proceedings of the First Conference on Machine Translation: vol. 2, Shared Task Papers*, Jun. 27, 2016 (pp. 371-376).
Shen, Shiqi, et al., "Minimum Risk Training for Neural Machine Translation", *Proceedings of the 54th Annual Meeting of the Association for Computational Linguistics (vol. 1 : Long Papers) arXiv preprint arXiv:1512.02433*, Aug. 7-12, 2016 (pp. 1683-1692).
Hoang, Cong Duy Vu et al., "Towards Decoding as Continuous Optimisation in Neural Machine Translation", *Proceedings of the 2017 Conference on Empirical Methods in Natural Language Processing*, Jul. 22, 2017 (11 pages in English).
Zhang, Xiangwen, et al. "Asynchronous Bidirectional Decoding for Neural Machine Translation", *Thirty-Second AAAI Conference on Artificial Intelligence*, Feb. 3, 2018 (9 pages in English).
Extended European Search Report dated Mar. 26, 2019 in counterpart European Application No. 18197984.0 (12 pages in English).
Li, Jiwei, et al. "Adversarial Learning for Neural Dialogue Generation." arXiv preprint arXiv:1701.06547v5 [cs.CL] Sep. 24, 2017, (13 pages in English).
Chinese Office Action dated Feb. 21, 2023, in counterpart Chinese Patent Application No. 201810478297.0 (23 pages in English, 17 pages in Chinese).

* cited by examiner

METHOD OF UPDATING SENTENCE GENERATION MODEL AND SENTENCE GENERATING APPARATUS

CROSS-REFERENCE TO RELATED APPLICATIONS

This application claims the benefit under 35 USC § 119(a) of Korean Patent Application No. 10-2017-0133971 filed on Oct. 16, 2017, in the Korean Intellectual Property Office, the entire disclosure of which is incorporated herein by reference for all purposes.

BACKGROUND

1. Field

The following description relates to a method of updating a sentence generation model used to generate a sentence, and a method of generating a sentence using the sentence generation model.

2. Description of Related Art

Technological automation of speech recognition and translation has respectively been implemented through processor implemented neural network models, as specialized computational architectures, that after substantial training may provide computationally intuitive mappings between input patterns and output patterns, such as for recognizing spoken speech or translating such recognized speech or otherwise available text. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example. Such automated technology may be applied to various applications, such as, for example, an automated translator that generates a translated sentence of an original sentence and an automated conversation agent that is configured to converse with a user. However, because such operations or applications are performed through such specialized computation architectures, and in different automated manners than they would have been performed in non-computer implemented or non-automated approaches, they also invite problems or drawbacks that only occur because of the automated and specialized computational architecture manner that they are implement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented method includes: generating a target sentence corresponding to a source sentence using a first decoding model; calculating reward information associated with the target sentence using a second decoding model configured to generate a sentence in an order different from an order of the sentence generated by the first decoding model; and generating an updated sentence generation model by resetting respective weights of nodes in the first decoding model based on the calculated reward information.

The calculating of the reward information may include calculating the reward information based on a probability that each of words included in the target sentence is generated from the second decoding model.

The calculating of the reward information may further include calculating, based on the source sentence and a first word output from the second decoding model at a previous time, a probability that a second word is generated from the second decoding model at a current time.

The calculating of the reward information may further include calculating the reward information based on a word sequence in which the words included in the target sentence are arranged in an order different from an order of the words in the target sentence.

The first decoding model may be a forward decoding model including a recurrent neural network (RNN), and the second decoding model may be a backward decoding model including another RNN.

The resetting of the respective weights may include calculating, using the first decoding model, policy information associated with the target sentence, and resetting the respective weights based on the respective weights corresponding to a specified condition, using the calculated policy information and the calculated reward information.

The calculating of the policy information may include calculating the policy information based on a probability that each of words included in the target sentence is generated from the first decoding model.

The calculating of the policy information may further include calculating, based on the source sentence and a first word output from the first decoding model at a previous time, a probability that a second word is generated from the first decoding model at a current time.

The resetting of the respective weights may further include resetting weights that maximize an objective function defined by reward information and policy information associated with each of target sentences. The target sentences may be generated from the source sentence using the first decoding model.

The resetting of the respective weights may further include resetting weights that minimize a loss function defined by an objective function and a probability that a predetermined correct sentence for the source sentence is generated from the first decoding model. Target sentences may be generated from the source sentence using the first decoding model, and the objective function may be defined by reward information and policy information associated with each of the target sentences.

The generating of the target sentence may include generating target sentences in response to a final result value, among final result values output from the first decoding model in response to the source sentence, being in a specified range.

The generating of the target sentence may include generating target sentences based on an output value output from the first decoding model at a first time in response to a word in the source sentence. The calculating of the reward information may include calculating, using the second decoding model, reward information associated with the target sentences generated at the first time.

The generating of the target sentence may include generating a specified number of target sentences by sampling an output value output from the first decoding model at a first time in response to a word in the source sentence. The calculating of the reward information may include calculating, using the second decoding model, reward information associated with the specified number of target sentences.

The generating of the target sentence may include generating first target sentences based on an output value output from the first decoding model in response to each of words included in the source sentence, and generating second target sentences in response to a final result value, among final result values output from the first decoding model in response to an entirety of the source sentence, being in a specified range.

The calculating of the reward information may include calculating, using the second decoding model, first reward information associated with the first target sentences, and calculating, using the second decoding model, second reward information associated with the second target sentences.

The method may further include: generating, using the second decoding model, a new target sentence corresponding to the source sentence; calculating, using the first decoding model, reward information associated with the new target sentence; and resetting a weight of each of nodes in the second decoding model based on the calculated reward information.

In another general aspect, a non-transitory computer-readable storage medium may store instructions that, when executed by a processor, cause the processor to perform the method described above.

In another general aspect, a sentence generating apparatus includes: a generator configured to generate a target sentence corresponding to a source sentence using a first decoding model; a calculator configured to calculate reward information associated with the target sentence using a second decoding model; and an updater configured to generate an updated sentence generation model by resetting respective weights of nodes in the first decoding model based on the calculated reward information.

The calculator may be further configured to calculate the reward information based on a word sequence in which words included in the target sentence are arranged in an order different from an order of the words in the target sentence.

The calculator may be further configured to calculate the reward information by calculating, based on the source sentence and a first word output from the second decoding model at a previous time, a probability that a second word is generated from the second decoding model at a current time.

The calculator may be further configured to calculate the reward information by inputting, to the second decoding model, a word sequence in which characters included in each of words included in the target sentence are separated.

The calculator may be further configured to calculate, based on the source sentence and a first character output from the second decoding model at a previous time, the reward information by calculating a probability that a second character is generated from the second decoding model at a current time.

The generator may be further configured to generate target sentences in response to a final result value, among final result values output from the first decoding model in response to the source sentence, being in a specified range.

The generator may be further configured to generate target sentences based on an output value output from the first decoding model at a first time in response to a word in the source sentence. The calculator may be further configured to calculate reward information associated with the target sentences generated at the first time using the second decoding model.

The generator may be further configured to generate first target sentences based on an output value output from the first decoding model in response to each of words in the source sentence, and generate second target sentences in response to a final result value, among final result values output from the first decoding model in response to an entirety of the source sentence, being in a specified range.

The calculator may be further configured to calculate, using the second decoding model, first reward information associated with the first target sentences, and calculate, using the second decoding model, second reward information associated with the second target sentences.

The generator may be further configured to generate, using the second decoding model, a new target sentence corresponding to the source sentence. The calculator may be further configured to calculate, using the first decoding model, reward information associated with the new target sentence. The updater may be further configured to reset respective weights of nodes in the second decoding model based on the calculated reward information.

Other features and aspects will be apparent from the following detailed description, the drawings, and the claims.

Figure 1:
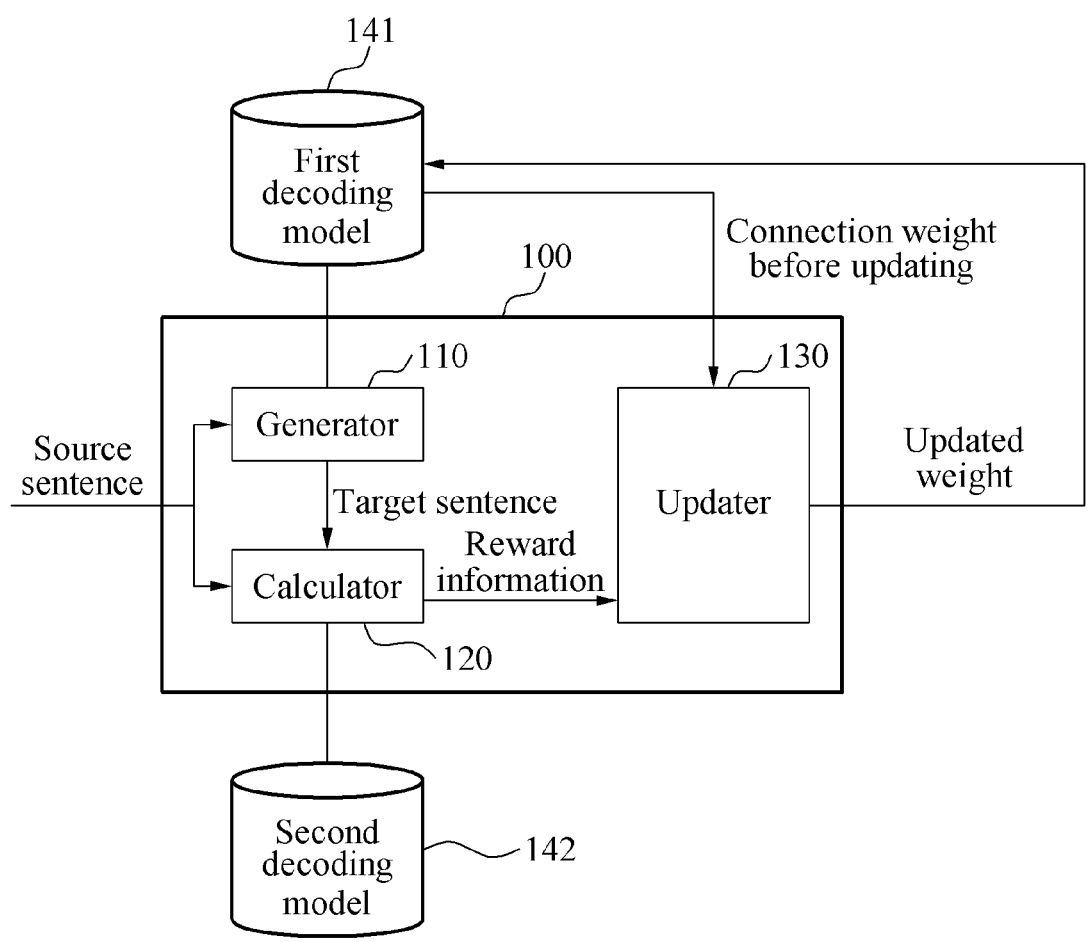
FIG. 1 is a diagram illustrating an example of an apparatus for updating a sentence generation model, or an updating apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

FIG. 1 is a diagram illustrating an example of an apparatus for updating a sentence generation model. The apparatus for updating a sentence generation model will be simply referred to as an updating apparatus hereinafter. The sentence generation model described herein is a language model configured to predict a target sentence to follow based on an input source sentence. For example, the sentence generation model is a translation model configured to receive an original sentence as an input and generate a translated sentence of the original sentence. For another example, the sentence generation model is a conversation agent model configured to receive a source sentence as an input and generate a dialogue corresponding to the source sentence. The translation model and the conversation agent model described above are provided merely as illustrative examples, and thus are not to be construed as excluding other examples or otherwise limiting a scope of the disclosure. The sentence generation model to be described hereinafter may be a language model of various types that is configured to output a target sentence corresponding to a source sentence based on a preset or specified condition. As another example, any of such models may include or be respective neural networks or neural network portions.

In such examples, the respective neural network is a single hidden layer neural network (NN) or a deep neural network (DNN). In such examples, the NN or DNN may be one or more of a fully connected network, a convolutional neural network, a recurrent neural network, or bi-directional neural network, or may include different or overlapping neural network portions respectively with such full, convolutional, recurrent, and/or bi-directional connections. The neural network may be configured to perform, as non-limiting examples, speech recognition, translation, and/or agent conversation or interaction by respectively mutually mapping input data and output data in nonlinear relationships based on learning, e.g., based on deep learning. Such learning or deep learning is indicative of processor implemented machine learning schemes for solving issues, such as issues related to automated speech recognition, translation, and/or agent conversation or interaction from a big data set, as non-limiting examples. The learning may be implemented by mapping of input data and the output data through supervised or unsupervised learning or training, such that when trained the resultant machine learning model, engine, or example NN may intuitively map further unknown input data to output data with a desired accuracy or reliability. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The example neural network includes one or more input layers, one or more hidden layers, and one or more output layers. The input layer and the output layer may respectively include one or more nodes and the hidden layer(s) may each include a plurality of nodes. When an overall neural network includes multiple portions trained for different objectives, there may or may not be input layers or output layers between the different portions.

Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure forward and backward connections may be provided. The links are also referred to as connections or connection weights, as referring to the hardware implemented connections or the corresponding 'connection weights' provided by those connections of the neural network. During training and implementation such connections and connection weights may be selectively implemented, removed, and varied to generate or obtain a resultant neural network that is thereby trained and that may be correspondingly implemented for the trained objective, such as for any of the above example recognition objectives.

The architecture, selective connections between neighboring nodes, and corresponding connection weights may be varied during training. The connection weights of the neuro network may be referred to as parameters of the neural network. For example, in a non-limiting supervised training example, the neural network may be trained based on labeled input image information or desired corresponding output recognitions or classifications and through back-propagation, as only an example. In the training, connection weightings between nodes of different hidden layers may be recursively adjusted, e.g., through back propagation, until the corresponding neural network model is trained with a desired accuracy rate or below a maximum error rate, for example. The respectively trained neuro network may be stored in a memory of any of the training, recognition, translation, and/or agent conversation or interaction apparatuses herein. For example, the trained neural network may be stored in trained vectors, matrix or matrices, or other format, where elements of the matrix represent or suggest the corresponding trained weighted connections (parameters) of the corresponding neural network structure. The stored trained neural network may further include hyper-parameter information, which may define the specific structure or architecture of the corresponding neural network for which the example stored trained parameters correspond to. The hyper-parameters may define how many hidden layers, the function of the layers, such as whether they are recurrent, convolutional, bi-directional, and/or fully connected hidden layers of the neural network structure. In one example, the structure may include convolutional connections. The hyper-parameters may further include information of the configuration and values of any bias and/or contextual nodes in the neural network in differing examples, corresponding activation functions of the nodes, types of nodes, such as long short-term memory nodes in some examples, and define any or any further recurrent or bi-directional structures of the neural network, which may vary in differing embodiments. Here, the example neural network information within the neural network may be information resident at, or represented by, respective layers of the neural network, and/or respective information resident at, or represented by, respective connections within the neural network. In some examples, a layer or a series of layers may output or generate one or more extracted feature information of information provided to the layer and dependent on the respective connection weights and types of connections of the layer(s). In this example, the input of each of the layers may be one, two, three, or more dimensional information, such as a multi-dimensional vector, just as the hidden layer(s) respective neural network information and the output of the neural network may also be single or multi-dimensional information dependent on the set parameters and architecture of the neural network. The output of the neural network may also be probabilistic information.

Referring to FIG. 1, an updating apparatus 100 includes a generator 110, a calculator 120, and an updater 130. The updating apparatus 100 is representative of at least one processor, and the generator 110, the calculator 120, and the updater 130 may be implemented by the processor.

In an example, in response to a source sentence being input, the updating apparatus 100 outputs an updated connection weight of a first decoding model 141. The first decoding model 141 may output a connection weight, which is a connection weight before updating, to the updater 130. As noted above, the connection weight refers to a connection weight among nodes included in the first decoding model 141 before the updating. The updated connection weight described herein is a connection weight of each of nodes included in the first decoding model 141. That is, the updating apparatus 100 may generate a target sentence corresponding to the input source sentence, and reset a connection weight of the first decoding model 141 based on reward information associated with the generated target sentence. While the present description repeatedly operations performed with respect to a single connection weight, such as outputting and updating a single connection weight, it is to be understood that multiple connection weights among nodes may be updated and output using the described apparatus and method. In another example, the updating apparatus 100 receives the source sentence, updates a threshold value of an activation function to be applied to each of the nodes in the first decoding model 141, and outputs the updated threshold value.

The generator 110 receives the source sentence as an input and generates the target sentence. The generator 110 may generate the target sentence corresponding to the input source sentence using the first decoding model 141. In an example, the generator 110 generates target sentences corresponding to the source sentence based on a preset or specified rule. Hereinafter, a manner in which target sentences are generated by the generator 110 will be described in detail with reference to the following other drawings.

The calculator 120 calculates the reward information associated with the target sentence transferred from the generator 110. The calculator 120 may calculate the reward information associated with the target sentence using a second decoding model 142. In an example, the calculator 120 calculates reward information by calculating a probability that a second word is generated from the second decoding model 142 at a current time using the source sentence and a first word output from the second decoding model 142 at a previous time. The calculator 120 outputs the calculated reward information to the updater 130.

The updater 130 may reset a connection weight of each of the nodes in the first decoding model 131 based on the calculated reward information. In an example, the updater 130 calculates policy information associated with the target sentence using the first decoding model 141. In addition, the updater 130 may reset a connection weight corresponding to a preset or specified condition using the calculated reward information and the calculated policy information.

The updating apparatus 100 may store, in a preset or specified storage, the first decoding model 141 to generate the target sentence and the second decoding model 142 to calculate the reward information. For example, the preset or specified storage is a memory area in the updating apparatus 100, and/or an external memory device connected to the updating apparatus 100 through an interface.

In an example, a neural network is used as the first decoding model 141 and the second decoding model 142. For example, a recurrent neural network (RNN), or a neural network including recurrent connections, in which an output value of a hidden layer at a previous time is input again to a hidden layer at a current time is used as the first decoding model 141 and the second decoding model 142. However, the foregoing example is provided merely as an illustrative example to enhance an understanding of the first decoding model 141 and the second decoding model 142, and thus are not to be construed as excluding other examples or otherwise limiting a scope of the disclosure. For example, each of the first decoding model 141 and the second decoding model 142 may be embodied or implemented in various types of a neural network, such as a deep neural network (DNN) and a convolutional neural network (CNN).

Hereinafter, a manner in which a target sentence is generated using a source sentence, and reward information is calculated will be described in detail with reference to the following drawings.

Figure 2:
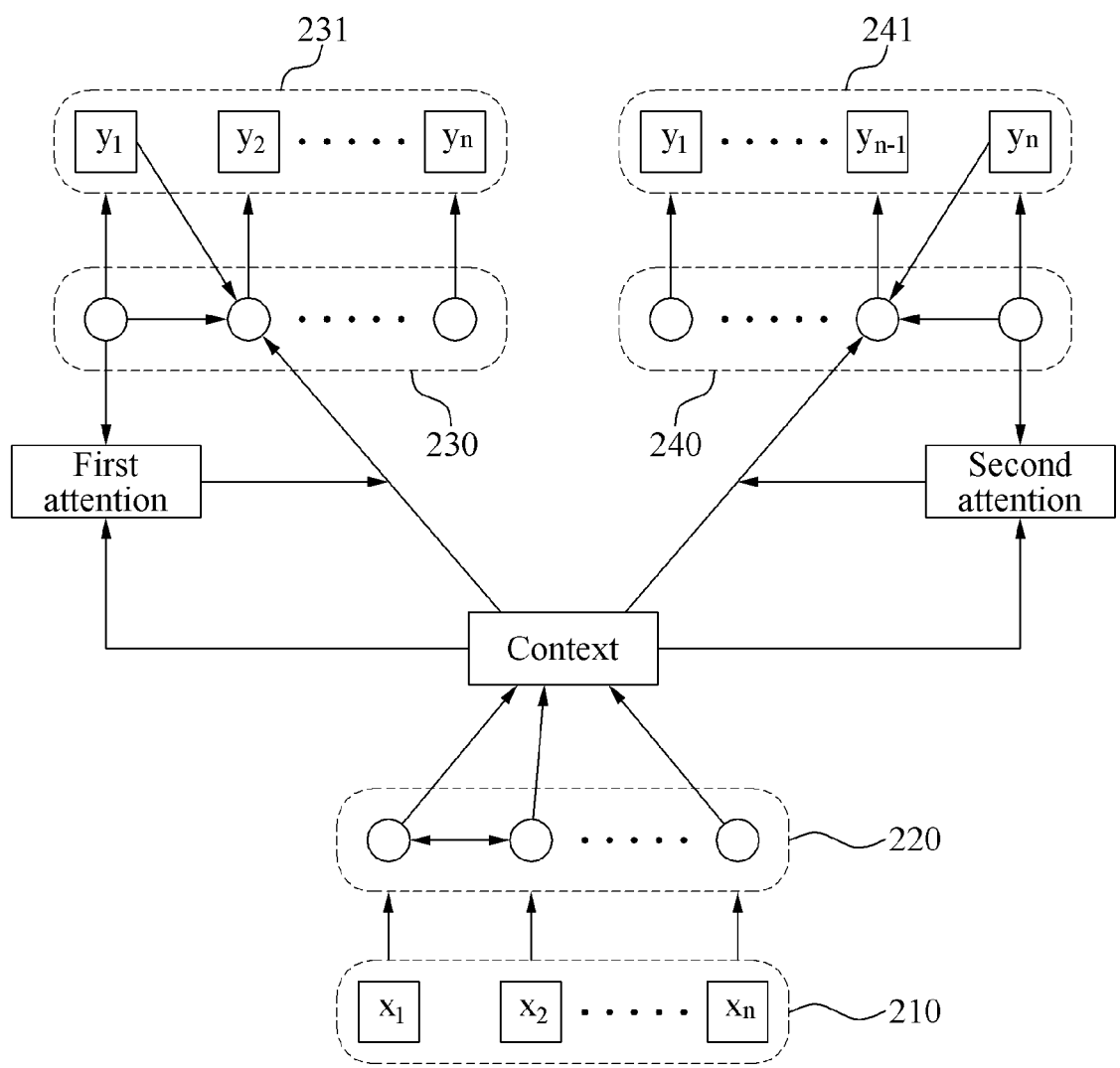
FIG. 2 is a diagram illustrating an example of a manner in which a target sentence is generated and reward information is calculated.

FIG. 2 is a diagram illustrating an example of a manner in which a target sentence is generated and reward information is calculated. Referring to FIG. 2, at each time increment, a feature value of a source sentence 210 is input to a first decoding model 230 configured to generate a first target sentence 231. For example, as illustrated, the source sentence 210 is a sentence in which words, for example, $x_1$, $x_2$, ..., $x_n$, are arranged in a predetermined or specified order. In such an example, each of the words $x_1$, $x_2$, ..., $x_n$ included in the source sentence 210 is input to a predetermined or specified encoding model 220 and extracted as a feature value. The feature value extracted from the source sentence 210 includes context information and first attention information. The context information described herein includes compressed information indicating semantic information of the source sentence 210. The first attention information described herein includes information indicating which information of the source sentence 210 needs to be verified to generate the first target sentence 231 at a current time.

The context information and the first attention information associated with the source sentence 210 are input to a node in the first decoding model 230. The first decoding model 230 may be, but is not limited to, an RNN in which an output value of a hidden layer at a previous time is input again to a hidden layer at a current time. For example, as illustrated, in a process in which a second word $y_2$ in the first target sentence 231 is determined, a first output value of a hidden layer at a previous time and a first word $y_1$ output at a previous time are used along with the context information and the first attention information. In addition, the first decoding model 230 may be a forward decoding model configured to perform decoding in a sequential order from a beginning of a target sentence to an end of the target sentence. In such an example, the updating apparatus 100 generates the first target sentence 231 in a word order starting from the first word $y_1$ and ending with an nth word $y_n$ using the first decoding model 230.

Similarly, the context information and second attention information associated with the source sentence 210 are input to a node in a second decoding model 240. The second decoding model 240 may also be, but is not limited to, an RNN. In an example, the second decoding model 240 is a backward decoding model configured to perform decoding in a sequential order from an end of a target sentence to a beginning of the target sentence. That is, the second decoding model 240 may use a second target sentence 241 in an order opposite to an order of the first target sentence 231 generated by the first decoding model 230. In such an example, the second target sentence 241 includes a word sequence in which words included in the first target sentence 231 are arranged in an order starting from the nth word $y_n$ and ending with the first word $y_1$.

The updating apparatus 100 calculates reward information based on a probability that each of words included in the second target sentence 241 is generated from the second decoding model 240. The updating apparatus 100 calculates a probability that a second word is generated from the second decoding model 240 at a current time using the feature value of the source sentence 210 and a first word output from the second decoding model 240 at a previous time, and calculates the reward information using the calculated probability.

Although each of the encoding model 220, the first decoding model 230, and the second decoding model 240 is illustrated as a single layer in FIG. 2 for convenience of description, the disclosure is not limited to such an example. For example, a multilayer structure in which each of the encoding model 220, the first decoding model 230, and the second decoding model 240 includes an input layer, a hidden layer, and an output layer may also be provided.

In an example, the updating apparatus 100 uses a forward decoding model including an RNN as the first decoding model 230 to generate a target sentence, and use a backward decoding model including an RNN as the second decoding model 240 to calculate reward information. Thus, the updating apparatus 100 may reset a connection weight of each of nodes in the forward decoding model based on the reward information calculated from the backward decoding model, and thus generate a sentence generation model that may prevent decoding only in one direction when generating a sentence and also provide variously expressed sentences.

Figure 3A:
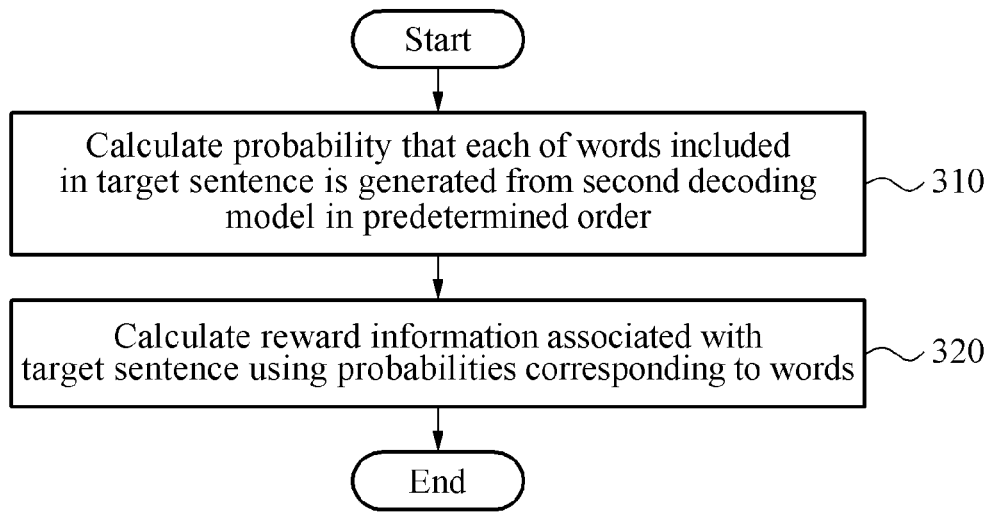
FIG. 3A is a flowchart illustrating an example of a method of calculating reward information associated with a target sentence.

FIG. 3A is a flowchart illustrating an example of a method of calculating reward information associated with a target sentence. Referring to FIG. 3A, a method of calculating reward information associated with a target sentence includes an operation 310 of calculating, in a predetermined or specified order, a probability that each of words included in the target sentence is generated from a second decoding model, and an operation 320 of calculating reward information associated with the target sentence using the calculated respective probabilities of the words.

In operation 310, the probability that each of the words included in the target sentence is generated from the second decoding model is calculated. The target sentence is a sentence generated from a first decoding model different from the second decoding model. For example, the target sentence is a plurality of target sentences generated from a source sentence using a forward decoding model. In such an example, in operation 310, a probability that each of words included in a first target sentence among the plurality of target sentences is generated from the second decoding model may be calculated.

In such an example, an nth target sentence $T^n$ including words arranged in an order of a first word $y_1 \rightarrow$ a second word $y_2 \rightarrow$ (omitted) $\rightarrow$ a Tth word $y_T$, may be generated from the first decoding model. The nth target sentence $T^n$ may also be indicated as $y_{1:T}$ using an order in which the words are arranged. For example, the words included in the nth target sentence $T^n$ are arranged in an order illustrated in Table 1.

TABLE 1

| Entire sentence | First word | Second word | (omitted) | T-1th word | Tth word |
|---|---|---|---|---|---|
| $T^n$ | $y_1$ | $y_2$ | (omitted) | $Y_{T-1}$ | $Y_T$ |

In such an example, in operation 310, a probability that each of the words included in the nth target sentence $T^n$ is generated from the second decoding model may be calculated. In detail, the probability that each of the words is generated from the second decoding model may be calculated using a word sequence $\tilde{T}^n$ in which the words included in the nth target sentence $T^n$ are arranged in a reverse order. The word sequence $\tilde{T}^n$ is a sequence in which the words in the nth target sentence $T^n$ are arranged in the reverse order, and may include the words in the reverse order starting from the Tth word $y_T \rightarrow$ the T-1th word $y_{T-1} \rightarrow$ (omitted) $\rightarrow$ the second word $y_2 \rightarrow$ the first word $y_1$. Similarly, the word sequence $\tilde{T}^n$ may be indicated as $y_{T:1}$ using an order in which words included in the word sequence $\tilde{T}^n$ are arranged. For example, the words included in the word sequence $\tilde{T}^n$ are arranged in an order illustrated in Table 2.

TABLE 2

| Entire sequence | First word | Second word | (omitted) | T-t + 1th word | (omitted) | Tth word |
|---|---|---|---|---|---|---|
| $\tilde{T}^n$ | $y_T$ | $y_{T-1}$ | (omitted) | $y_t$ | (omitted) | $y_1$ |

For example, in operation 310, a probability that a T-t+1th word $y_t$ is generated from the second decoding model is calculated. In detail, as represented by Equation 1 below, the probability that the T-t+1th word $y_t$ is generated from the second decoding model at a current time may be calculated using a source word and words generated from the second decoding model at a previous time. The T-t+1th word $y_t$ may be a word arranged T-t+1th from a starting point, for example, in a left direction, of the word sequence $\tilde{T}^n$.

$$P(y_t|y_{T+1:t+1},S;\Phi) \qquad \text{[Equation 1]}$$

In Equation 1, S is a source sentence input to a first decoding model and a second decoding model, and $y_{T+1:t+1}$ is an output value of words output from the second decoding model at a previous time. In $y_{T+1:t+1}$, $y_{T+1}$ is information indicating an end of an nth target sentence $T^n$. Also, in $y_{T+1:t+1}$, $y_T$ to $y_{t+1}$ indicate an output value of words from a first word to a T-th word in the entire word sequence $\tilde{T}^n$. In addition, in Equation 1, $\Phi$ is a weight parameter that defines a connection of nodes in the second decoding model.

In operation 310, the probability that each of the words included in the nth target sentence $T^n$ is generated from the second decoding model based on an order in which the words are arranged in the word sequence $\tilde{T}^n$ is calculated. In detail, a probability $P(y_T|y_{T+1}, S; \Phi)$ that the first word $y_T$ included in the word sequence $\tilde{T}^n$ is generated from the second decoding model may be first calculated, and a probability $P(y_{T-1}|y_{T+1}:y_T, S; \Phi)$ that the second word $y_{T-1}$ is generated from the second decoding model may be calculated. A probability $P(y_1|y_{T+1:2}, S; \Phi)$ that the last word $y_1$ is generated from the second decoding model may then be calculated, and, thus, the respective probabilities of the words may all be calculated in a sequential order. Although a process in which the probabilities that the words included in the nth target sentence $T^n$ are calculated is described herein for convenience of description, a person skilled in the art will understand that a probability that each of words included in each of target sentences generated by the updating apparatus described herein is calculated as described above.

In operation 320, the reward information associated with the target sentence is calculated using the respective probabilities of the words. For example, reward information $r_n$ associated with the nth target sentence $T^n$ is calculated as represented by Equation 2.

$$r_n = \log P(\tilde{T}^n|S;\Phi) \qquad \text{[Equation 2]}$$

In Equation 2, $P(\tilde{T}^n|S; \Phi)$ is a probability that the word sequence $\tilde{T}^n$ in the reversed order in which the words in the nth target sentence $T^n$ are arranged backwards is generated from the second decoding model. $P(\tilde{T}^n|S; \Phi)$ may be calculated as represented by Equation 3 below.

$$P(\tilde{T}^n \mid S; \Phi) = \prod_{t=T}^{1} P(y_t \mid y_{T+1:t+1}, S; \Phi) \qquad \text{[Equation 3]}$$

The probability that the word sequence $\tilde{T}^n$ is generated from the second decoding model may be calculated as a value, or a product, obtained by multiplying probabilities that the words included in the word sequence $\tilde{T}^n$ are generated in a sequential order. In detail, the probability that the word sequence $\tilde{T}^n$ is generated from the second decoding model may be calculated as a value, or a product, obtained by multiplying respective probabilities that the words from the first word $y_T$ to the last word $y_1$ in the sequence $\tilde{T}^n$ are generated from the second decoding model in a sequential order.

The method of calculating reward information that is described above may be performed by the updating apparatus 100, and operations 310 and 320 may be performed by the calculator 120 included in the updating apparatus 100.

Figure 3B:
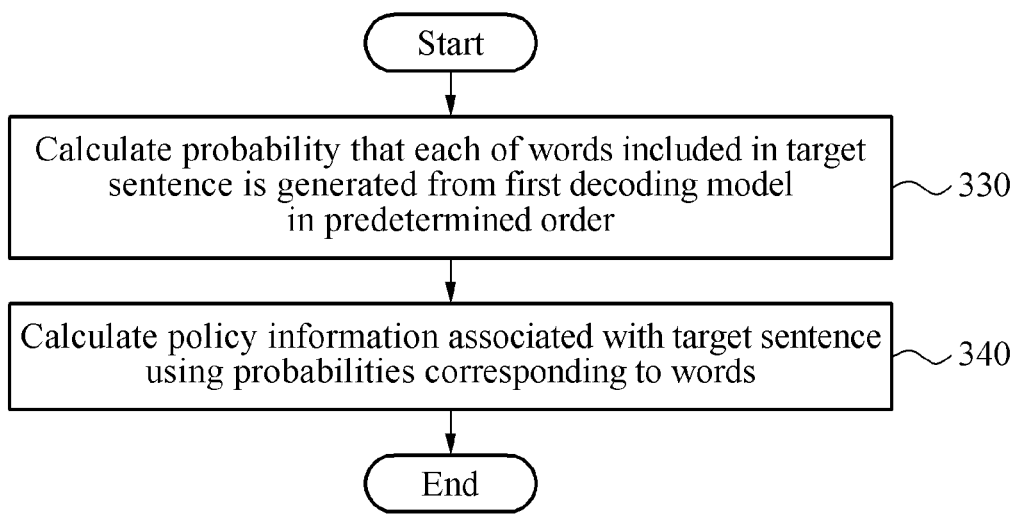
FIG. 3B is a flowchart illustrating an example of a method of calculating policy information associated with a target sentence.

FIG. 3B is a flowchart illustrating an example of a method of calculating policy information associated with a target sentence. Referring to FIG. 3B, the method of calculating policy information associated with a target sentence includes an operation 330 of calculating a probability that each of words included in the target sentence is generated from a first decoding model, and an operation 340 of calculating the policy information associated with the target sentence using the calculated respective probabilities of the words.

In operation 330, the probability that each of the words included in the target sentence is generated from the first decoding model is calculated. The target sentence is a sentence generated from the first decoding model. For example, in an example in which the first decoding model is a forward decoding model, the target sentence may be a plurality of target sentences generated from a source sentence using the forward decoding model.

For example, in operation 330, a probability that each of words included in a first target sentence among a plurality of target sentences is generated from the first decoding model is calculated. Hereinafter, a method of calculating a probability that each of words included in an nth target sentence $T^n$ is generated from the first decoding model will be described as an example for convenience of description. However, it can be clearly understood that a probability that each of words included in each of the plurality of target sentences is generated from the first decoding model is calculated in a same method.

For example, the nth target sentence $T^n$ including words in an order starting from a first word $y_1 \rightarrow$ a second word $y_2 \rightarrow$ (omitted)$\rightarrow$ a Tth word $y_T$ may be generated from the first decoding model. The nth target sentence $T^n$ may be indicated as $y_{1:T}$ using an order in which the words included in the nth target sentence $T^n$ are arranged. In such an example, in operation 330, the probability that each of the words included in the nth target sentence $T^n$ is generated from the first decoding model may be calculated. In detail, a probability that a tth word $y_t$ included in the nth target sentence $T^n$ is generated from the first decoding model may be calculated as represented by Equation 4 below. The tth word $y_t$ may be a word arranged tth from a starting point, for example, in a left direction, of the nth target sentence $T^n$.

$$P(y_t|y_{0:t-1},S;\theta) \quad [\text{Equation 4}]$$

In Equation 4, S is a source sentence input to a first decoding model, and $y_{0:t-1}$ is an output value associated with words output from the first decoding model at a previous time. In $y_{0:t-1}$, $y_0$ is information indicating a beginning of an nth target sentence $T^n$. In addition, in $y_{0:t-1}$, $y_0$ to $y_{t-1}$ indicate an output value from a first word to a t−1th word in the nth target sentence $T^n$. In Equation 4, θ is a weight parameter that defines a connection of nodes in the first decoding model.

In operation 330, the probability that each of the words included in the nth target sentence $T^n$ is generated from the first decoding model in an order in which the words are arranged in the nth target sentence $T^n$. In detail, a probability $P(y_1|y_0, S; \theta)$ that the first word $y_1$ included in the nth target sentence $T^n$ is generated from the first decoding model is calculated first, a probability $P(y_2|y_{0:1}, S; \theta)$ that the second word $y_2$ is generated from the first decoding model is then calculated, and, lastly, a probability $P(y_T|y_{0:T-1}, S; \theta)$ that the last Tth word is generated from the first decoding model is calculated.

In operation 340, the policy information associated with the target sentence is calculated using the calculated respective probabilities of the words. For example, policy information $p_n$ associated with the nth target sentence $T^n$ is calculated as represented by Equation 5 below.

$$p_n = P(T^n|S;\theta) \quad [\text{Equation 5}]$$

In Equation 5, $P(T^n|S; \theta)$ is a probability that the words in the nth target sentence $T^n$ are generated from the first decoding model in a sequential order. In detail, $P(T^n|S; \theta)$ may be calculated as represented by Equation 6 below.

$$P(T^n|S;\theta) = \prod_{t=1}^{T} P(y_t|y_{0:t-1},S;\theta) \quad [\text{Equation 6}]$$

In Equation 6, $P(T^n|S; \theta)$ is calculated as a value, or a product, obtained by multiplying probabilities that the words in the nth target sentence $T^n$ are generated from the first decoding model in a sequential order starting from the first word $y_1$ to the last word $y_T$.

The method of calculating policy information associated with a target sentence that is described above may be performed by the updating apparatus 100. In detail, operations 330 and 340 may be performed by the updater 130 included in the updating apparatus.

As described above, the updating apparatus 100 may calculate policy information using a first decoding model that generates a target sentence, and calculate reward information using a second decoding model different from the first decoding model. In addition, the updating apparatus 100 may reset a connection weight of the first decoding model using the calculated policy information and the calculated reward information. Thus, the updating apparatus 100 may update a sentence generation model such that advantages of two decoding models, in which decoding is performed in opposite directions, are reflected without being biased in one direction. Hereinafter, a manner in which a connection weight of a first decoding model is reset will be described in detail with reference to the following drawings.

Figure 4A:
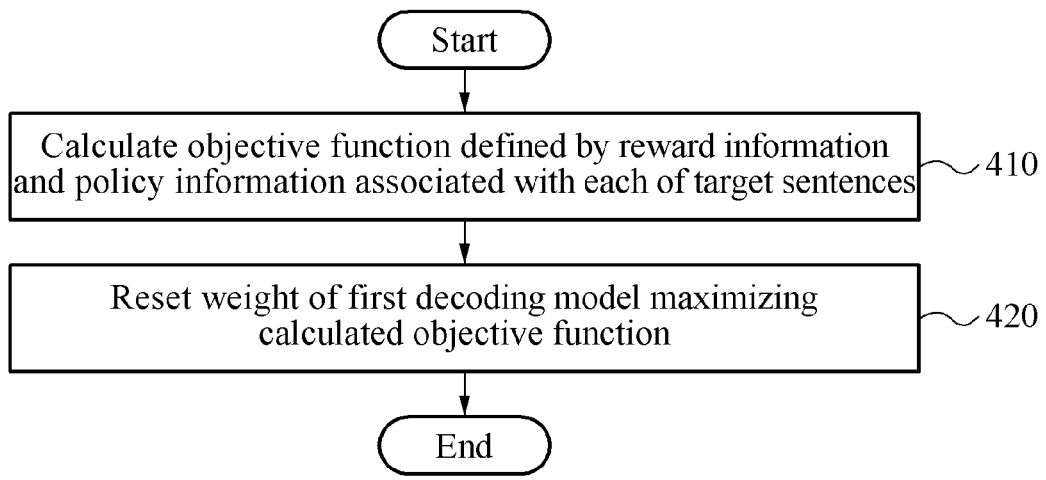
FIG. 4A is a flowchart illustrating an example of a method of resetting a connection weight of a first decoding model using an objective function.

FIG. 4A is a flowchart illustrating an example of a method of resetting a connection weight of a first decoding model using an objective function. Referring to FIG. 4A, the method of resetting a connection weight of a first decoding model using an objective function includes an operation 410 of calculating the objective function defined by reward information and policy information associated with each of target sentences, and an operation 420 of resetting a connection weight of the first decoding model that maximizes the calculated objective function.

In operation 410, the objective function defined by the reward information and the policy information associated with each of the target sentences is calculated. The objective function may be calculated based on the reward information and the policy information. For example, the objective function is defined based on a policy gradient method of reinforcement learning. The policy gradient method is well-known to those skilled in the art, and, thus, a detailed description of the policy gradient method is omitted here for brevity and clarity.

For example, target sentences are generated by the updating apparatus in response to a source sentence. In such an example, in operation 410, an objective function J(θ) may be calculated using reward information and policy information associated with each of the target sentences as represented by Equation 7 below.

$$J(\theta) = \frac{1}{N}\sum_{n=1}^{N} r_n \log P(T^n|S;\theta) \quad [\text{Equation 7}]$$

For example, in a case in which N target sentences are generated by the updating apparatus, the objective function J(θ) is calculated by adding products of multiplications of reward information and policy information, from a multiplication of first reward information $r_1$ and a log value log $P(T^1|S; \theta)$ of first policy information corresponding to a first target sentence $T^1$, to a multiplication of Nth reward information $r_N$ and a log value $\log P(T^N|S; \theta)$ of Nth policy information corresponding to an Nth target sentence $T^N$, and then by dividing a result value obtained by the adding by the number N of the target sentences.

In operation 420, a value of e that maximizes the calculated objective function $J(\theta)$ may be calculated. $\theta$ is a connection weight parameter of nodes in the first decoding model.

Although not illustrated in FIG. 4A, a connection weight of the first decoding model may be calculated using a method of minimizing a loss function defined from the objective function in operation 420. In detail, a loss function $L(\theta)$ may be defined as represented by Equation 8 below.

$$L(\theta) = \frac{1}{N}\sum_{n=1}^{N} r_n(-\log P(T^n | S; \theta)) \quad \text{[Equation 8]}$$

In an example, the connection weight $\theta$ of the first decoding model is calculated by applying a gradient descent method to the loss function $L(\theta)$. The gradient descent method is a method of discovering a local minimum by gradually moving the connection weight $\theta$ in an opposite direction of a calculated gradient. In detail, the connection weight $\theta$ of the first decoding model may be reset as represented by Equation 9 below.

$$\theta = \theta - \alpha \nabla_g L(\theta) \quad \text{[Equation 9]}$$

In Equation 9, the reset weight $\theta$ may be reset to move from the original connection weight $\theta$, by a learning rate $\alpha$, in an opposite direction of a gradient $\nabla_g L(\theta)$.

Figure 4B:
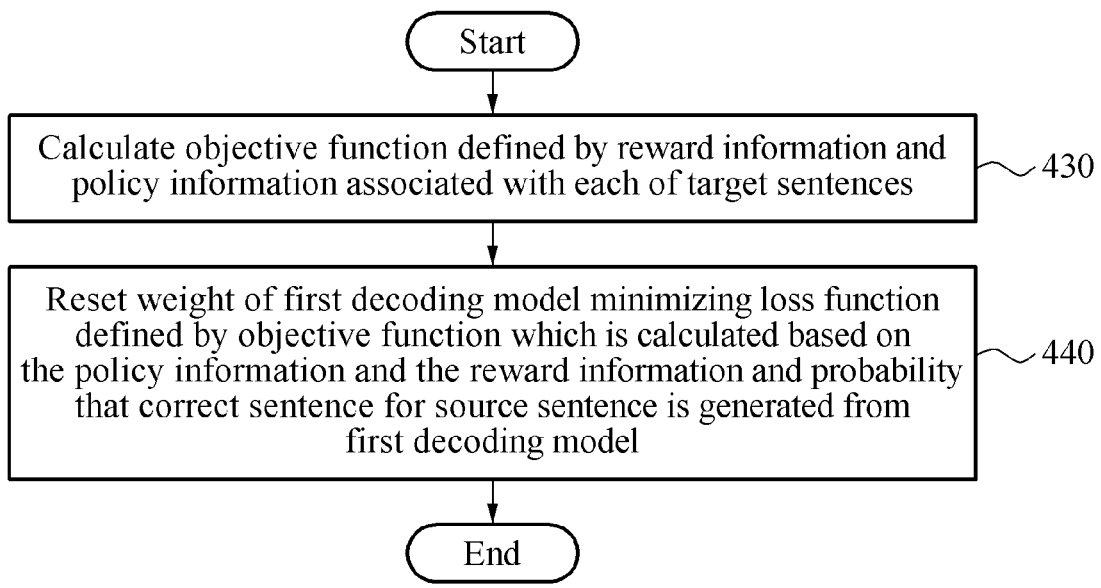
FIG. 4B is a flowchart illustrating an example of a method of resetting a connection weight of a first decoding model using a loss function.

FIG. 4B is a flowchart illustrating an example of a method of resetting a connection weight of a first decoding model using a loss function. Referring to FIG. 4B, the method of resetting a connection weight of a first decoding model using a loss function includes an operation 430 of calculating an objective function defined by reward information and policy information associated with each of a plurality of target sentences, and an operation 440 of resetting a connection weight of the first decoding model that minimizes a loss function defined by the calculated objective function and a probability that a correct sentence for a source sentence is generated from the first decoding model.

In operation 430, the objective function defined by the reward information and the policy information associated with each of the target sentences is calculated. The objective function may be calculated based on the reward information and the policy information. Regarding the method of calculating the objective function, reference may be made to operation 410 and Equation 7 described above with reference to FIG. 4A, and thus a more detailed and repeated description is omitted here for brevity and clarity.

In operation 440, the loss function defined by the objective function, which is calculated based on the reward information and the policy information, is calculated, and the probability that the correct sentence is generated from the first decoding model is calculated. In detail, a loss function $L(\theta)$ may be calculated as represented by Equation 10 below.

$$L(\theta) = -\log P(Y_{1:T}|S;\theta) - \lambda J(\theta) \quad \text{[Equation 10]}$$

In Equation 10, $Y_{1:T}$ indicates a predetermined or specified correct sentence for a source sentence S. For example, in a case of the source sentence S being an original sentence, $Y_{1:T}$ is a word sequence of a predetermined or specified correct translated sentence. As represented by Equation 10 above, the loss function ($\theta$) may be defined by a maximum likelihood loss and a weighted sum. In Equation 10, $\lambda$ is a weight parameter preset or specified for the objective function. In operation 440, similarly to operation 420, a connection weight of the first decoding model that minimizes the loss function $L(\theta)$ is calculated. For example, a connection weight $\theta$ of the first decoding model is calculated by applying a gradient descent method to the loss function $L(\theta)$.

The methods of resetting a connection weight that are described above with reference to FIGS. 4A and 4B may be performed by the updating apparatus 100. In detail, operations 410, 420, 430, and 440 may be performed by the updater 130 included in the updating apparatus 100.

Figure 5:
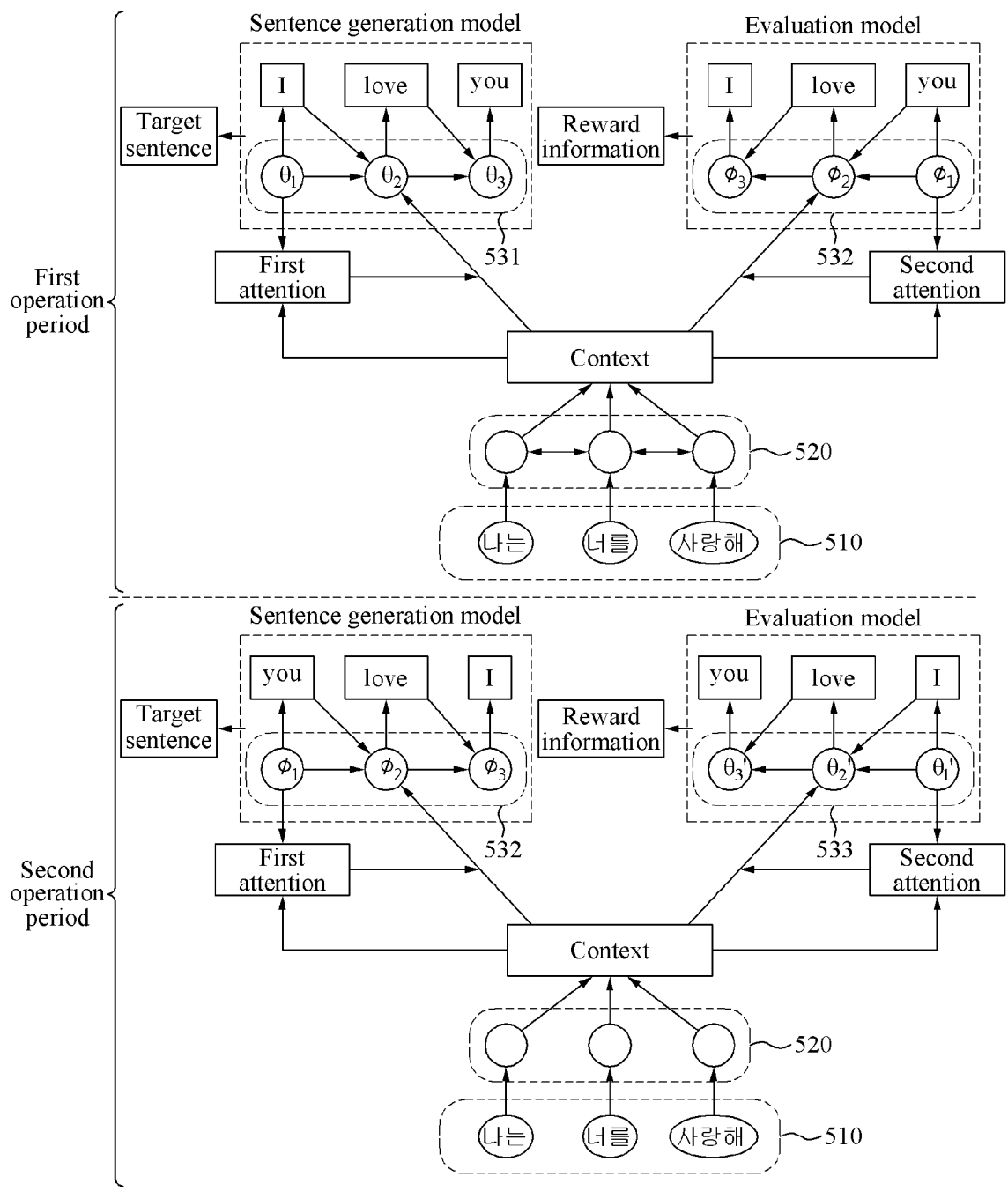
FIG. 5 is a diagram illustrating an example of a manner in which a role of a sentence generation model and a role of an evaluation model are exchanged in consecutive operation periods.

FIG. 5 is a diagram illustrating an example of a manner in which a role of a sentence generation model and a role of an evaluation model are exchanged in consecutive operation periods. FIG. 5 illustrates an example of a sentence generation model, and an example of an evaluation model configured to generate reward information associated with a generated target sentence. Although the illustrated example of the sentence generation model is embodied as a translation model, the example may not be construed as limiting a scope of other examples, and the sentence generation model may be embodied as a language model of various types configured to generate a predetermined or specified target sentence corresponding to a source sentence.

Referring to FIG. 5, in a first operation period of the updating apparatus, a first decoding model 531 is used as the sentence generation model. For example, the first decoding model 531 is a forward decoding model configured to perform decoding from a beginning of a target sentence to an end of the target sentence in a sequential order. For example, as illustrated, a feature value of a source sentence 510 "나는 너를 사랑해" is input to the first decoding model 531 to generate a target sentence "I love you." In this example, each of words "나는" "너를," and "사랑해" included in the source sentence 510 is input to a predetermined or specified encoding model 520, and a feature value is extracted. The feature value extracted from the source sentence 510 includes context information and first attention information. The context information is compressed information indicating semantic information of the source sentence 510. The first attention information is information indicating which information of the source sentence 510 needs to be verified to generate the target sentence at a current time.

In the first operation period, the context information and the first attention information associated with the source sentence 510 are input to a node in the first decoding model 531. In this example, nodes in the first decoding model 531 are connected based on preset or specified connection weights $\theta_1$, $\theta_2$, and $\theta_3$. The first decoding model 531 generates and outputs the target sentence based on the input feature value.

In the first operation period, a second decoding model 532 is used as the evaluation model. For example, the second decoding model 532 is a backward decoding model configured to perform decoding from an end of a target sentence to a beginning of the target sentence in a sequential order. As illustrated, a feature value of the source sentence 510 "나는 너를 사랑해" is also input to the second decoding model 532. The feature value extracted from the source sentence 510 includes the context information and second attention information.

The second decoding model 532 generates reward information using the feature value of the source sentence 510 and a sequence in which words included in the target sentence are arranged in a reverse order. In the first operation period, nodes in the second decoding model 532 are connected based on preset or specified connection weights $\Phi_1$, $\Phi_2$, and $\Phi_3$. Using the reward information output from the second decoding model 532, the connection weights of the nodes in the first decoding model 531 are reset to new connection weights $\theta_1'$, $\theta_2'$, and $\theta_3'$.

In a second operation period of the updating apparatus, the second decoding model 532 is used as the sentence generation model, and an updated first decoding model 533 is used as the evaluation model.

Based on an operation period of the updating apparatus, the sentence generation model and the evaluation model may reset a connection weight by changing roles thereof with each other. Thus, the updating apparatus may prevent suitable candidate words from being discarded or removed due to a decoding direction, for example, forward decoding or backward decoding, and may also update the sentence generation model to generate a sentence of an improved quality without being biased in one direction.

In the second operation period, the second decoding model 532 generates and outputs a target sentence based on a feature value of the source sentence 510 input to the second decoding model 532. The updated first decoding model 533 generates reward information using the feature value of the source sentence 510 and a sequence in which words included in the target sentence are arranged in a reverse order. The updated first decoding model 533 generates the reward information associated with the target sentence newly generated by the second decoding model 532 using the newly reset connection weights $\theta_1'$, $\theta_2'$, and $\theta_3'$. Similarly to the first operation period, the connection weights of the nodes in the second decoding model 532 are also reset to be new connection weights $\Phi_1'$, $\Phi_2'$, and $\Phi_3'$ using the reward information output from the updated first decoding model 533.

Figure 6:
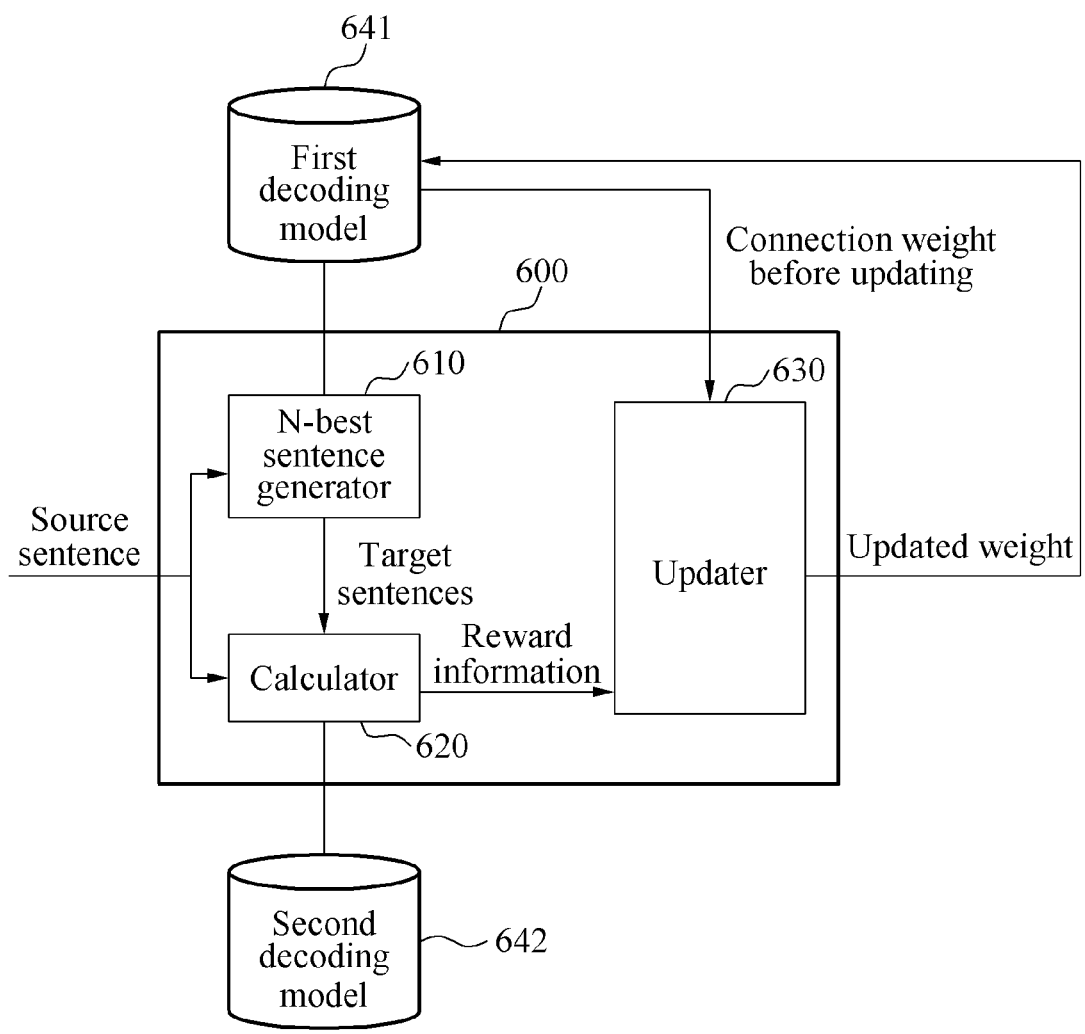
FIG. 6 is a diagram illustrating an example of an updating apparatus configured to generate a target sentence using an N-best algorithm.

FIG. 6 is a diagram illustrating an example of an updating apparatus 600 configured to generate a target sentence using an N-best algorithm. Referring to FIG. 6, the updating apparatus 600 includes an N-best generator 610, a calculator 620, and an updater 630. The updating apparatus 600 is configured to update a sentence generation model that includes the N-best sentence generator 610.

The updating apparatus 600 receives a source sentence as an input, and outputs an updated connection weight of a first decoding model 641. The updated connection weight is a connection weight of nodes included in the first decoding model 641.

The N-best sentence generator 610 receives the source sentence as an input, and generates target sentences. In detail, the N-best sentence generator 610 generates the target sentences based on a final result value, among final result values output from the first decoding model 641, being in a preset or specified range.

In an example in which the first decoding model 641 is an RNN, the first decoding model 641 may output a probability distribution of words included in a beam width at each time step. In such a case, the N-best sentence generator 610 may generate N target sentences having higher probabilities by combining the words in the beam width based on the final result values output from the first decoding model 641. The first decoding model 641 may output a connection weight, which is a connection weight before updating, to the updater 630. The connection weight is a connection weight among nodes included in the first decoding model 641 before the updating. The calculator 620 then calculates reward information associated with each of the target sentences transferred from the N-best sentence generator 610.

The updater 630 resets connection weights of nodes in the first decoding model 641 based on the calculated reward information, and outputs the updated connection weights to the first decoding model 641. For detailed operations of the calculator 620 and the updater 630, reference may be made to the preceding descriptions provided with reference to FIGS. 1, 3A and 3B, and 4A and 4B, and, thus, a more detailed and repeated description is omitted here for brevity and clarity.

Figure 7:
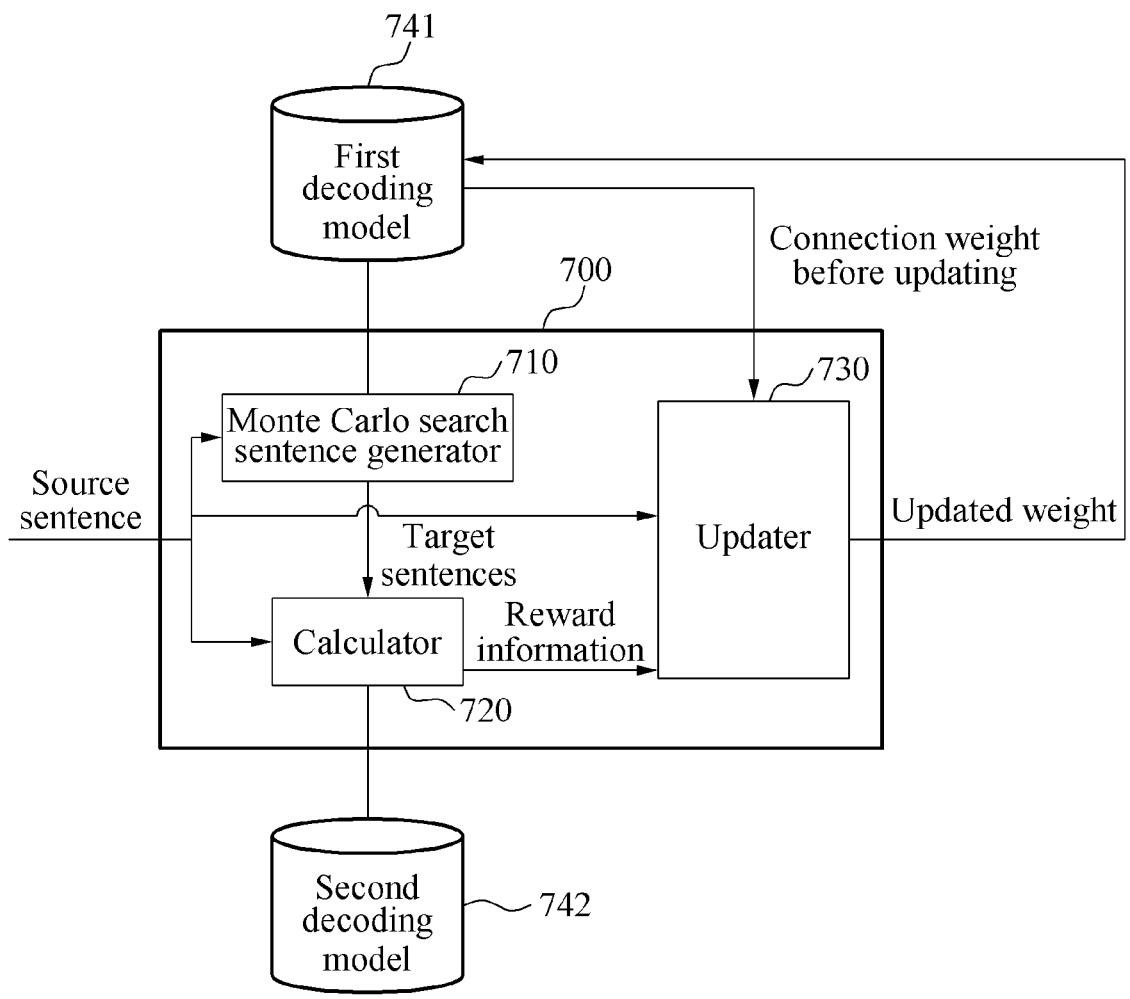
FIG. 7 is a diagram illustrating an example of an updating apparatus configured to generate a target sentence using a Monte Carlo search algorithm.

FIG. 7 is a diagram illustrating an example of an updating apparatus 700 configured to generate a target sentence using a Monte Carlo search algorithm. Referring to FIG. 7, the updating apparatus 700 includes a Monte Carlo search sentence generator 710, a calculator 720, and an updater 730.

The updating apparatus 700 generates a plurality of target sentences based on an output value output from a first decoding model 741 at each time step. In detail, the Monte Carlo search sentence generator 710 generates a preset or specified N number of target sentences by applying a Monte Carlo search to the output value output from the first decoding model 741 at each time step. The Monte Carlo search is an empirical search algorithm for decision making, and a method of performing a tree search based on a random extraction from a search space. In an example, the Monte Carlo sentence generator 710 searches for a target sentence based on an output value provided by the first decoding model 741 at a current time step, and generates the N target sentences having higher probabilities among retrieved target sentences. Similarly to the method described in the foregoing description, the Monte Carlo search sentence generator 710 generates target sentences at a first time before the first decoding model 741 outputs a final output value.

In an example, the Monte Carlo search sentence generator 710 generates a preset or specified number of target sentences by sampling output values output from the first decoding model 741 at each time step in response to a word in a source sentence. The Monte Carlo search sentence generator 710 samples words in a beam width using the output values of the first decoding model 741. The Monte Carlo search sentence generator 710 then generates the preset or specified number of target sentences by combining the sampled words.

In addition, the calculator 720 calculates reward information associated with the target sentences generated at the first time using a second decoding model 742. The calculator 720 calculates, in real time, the reward information associated with the target sentences. The first decoding model 741 may output a connection weight, which is one before updating, to the updater 730. The connection weight is a connection weight among nodes included in the first decoding model 741 before the updating. In addition, the updater 730 resets connection weights of nodes in the first decoding model 741 based on the calculated reward information, and outputs the updated connection weights to the first decoding model 741. For detailed operations of the calculator 720 and the updater 730, reference may be made to the descriptions provided above with reference to FIGS. 1, 3A and 3B, and 4A and 4B, and, thus, a more detailed and repeated description is omitted here for brevity and clarity.

As described above, the updating apparatus 700 may generate, in real time, target sentences using an output value output from the first decoding model 741 at each time step, and thus the updating apparatus 700 may reset, in real time, a connection weight of the first decoding model 741 at each time step. Thus, parallelization may be more readily implemented.

Figure 8A:
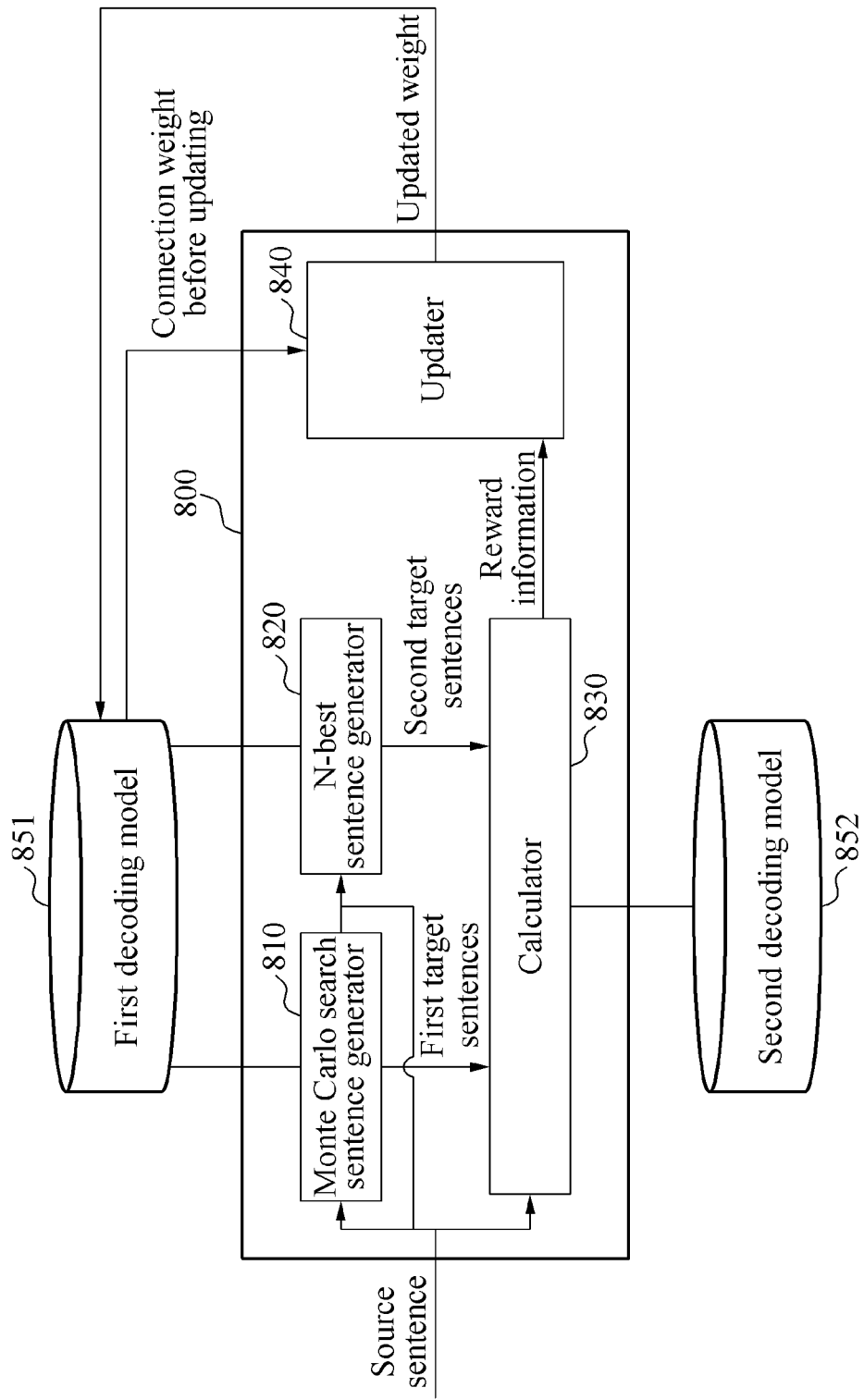
FIG. 8A is a diagram illustrating an example of an updating apparatus configured to generate a target sentence using an N-best algorithm and a Monte Carlo search algorithm together.

FIG. 8A is a diagram illustrating an example of an updating apparatus 800 configured to generate a target sentence using an N-best algorithm and a Monte Carlo search algorithm together. Referring to FIG. 8A, the updating apparatus 800 includes a Monte Carlo search sentence generator 810, an N-best sentence generator 820, a calculator 830, and an updater 840. The updating apparatus 800 is configured to update a sentence generation model that includes the Monte Carlo search sentence generator 810 and the N-best sentence generator 820.

The updating apparatus 800 generates first target sentences based on an output value output from a first decoding model 851 at each time step. Each of the first target sentences is generated based on an output value in response to each of words included in a source sentence. In detail, the Monte Carlo search sentence generator 810 generates a preset or specified number N of first target sentences by applying a Monte Carlo search to the output value output from the first decoding model 851 at each time step. For a detailed description of a manner in which the Monte Carlo search sentence generator 810 generates a first target sentence at each time step, reference may be made to the preceding description provided with reference to FIG. 7, and thus a more detailed and repeated description is omitted here for brevity and clarity.

The calculator 830 calculates first reward information corresponding to a real-time output value output from the first decoding model 851 using a second decoding model 852. The updater 840 resets a connection weight of the first decoding model 851 based on the calculated first reward information, and outputs the updated connection weight to the first decoding model 851. For detailed operations of the calculator 830 and the updater 840, reference may be made to the descriptions provided with reference to FIGS. 1, 3A and 3B, and 4A and 4B, and thus a more detailed and repeated description is omitted here for brevity and clarity.

As described above, the updating apparatus 800 may generate a first target sentence by applying a Monte Carlo search, although a final result value is not output from the first decoding model 851. Thus, the updating apparatus 800 may update, in real time, a connection weight of the first decoding model 851.

In addition, the updating apparatus 800 generates second target sentences based on a final result value output from the first decoding model 851 in response to an entire source sentence, or an entirety of the source sentence. In detail, the N-best sentence generator 820 generates the second target sentences based on a final result value, among final result values output from the first decoding model 851, being in a preset or specified range. The N-best sentence generator 820 outputs N target sentences having higher probabilities by combining words in a beam width among the final result values output from the first decoding model 851.

The calculator 830 calculates second reward information based on the final result value of the first decoding model 851 using the second decoding model 852. The first decoding model 851 may output a connection weight, which is a connection weight before updating, to the updater 840. The connection weight is a connection weight among nodes included in the first decoding model 851 before the updating. The updater 840 resets the connection weight of the first decoding model 851 based on the calculated second reward information, and outputs the updated connection weight to the first decoding model 851. As described above, when a final result value is output from the first decoding model 851, the updating apparatus 800 may update a connection weight of the first decoding model 851 using a second target sentence output from the N-best sentence generator 820. Thus, the updating apparatus 800 may apply, as a connection weight to the first decoding model 851, a learning or training result obtained based on a same method as in a sentence generation model that generates an actual sentence. Thus, the updating apparatus 800 may update the sentence generation model to provide a sentence of an improved quality.

Figure 8B:
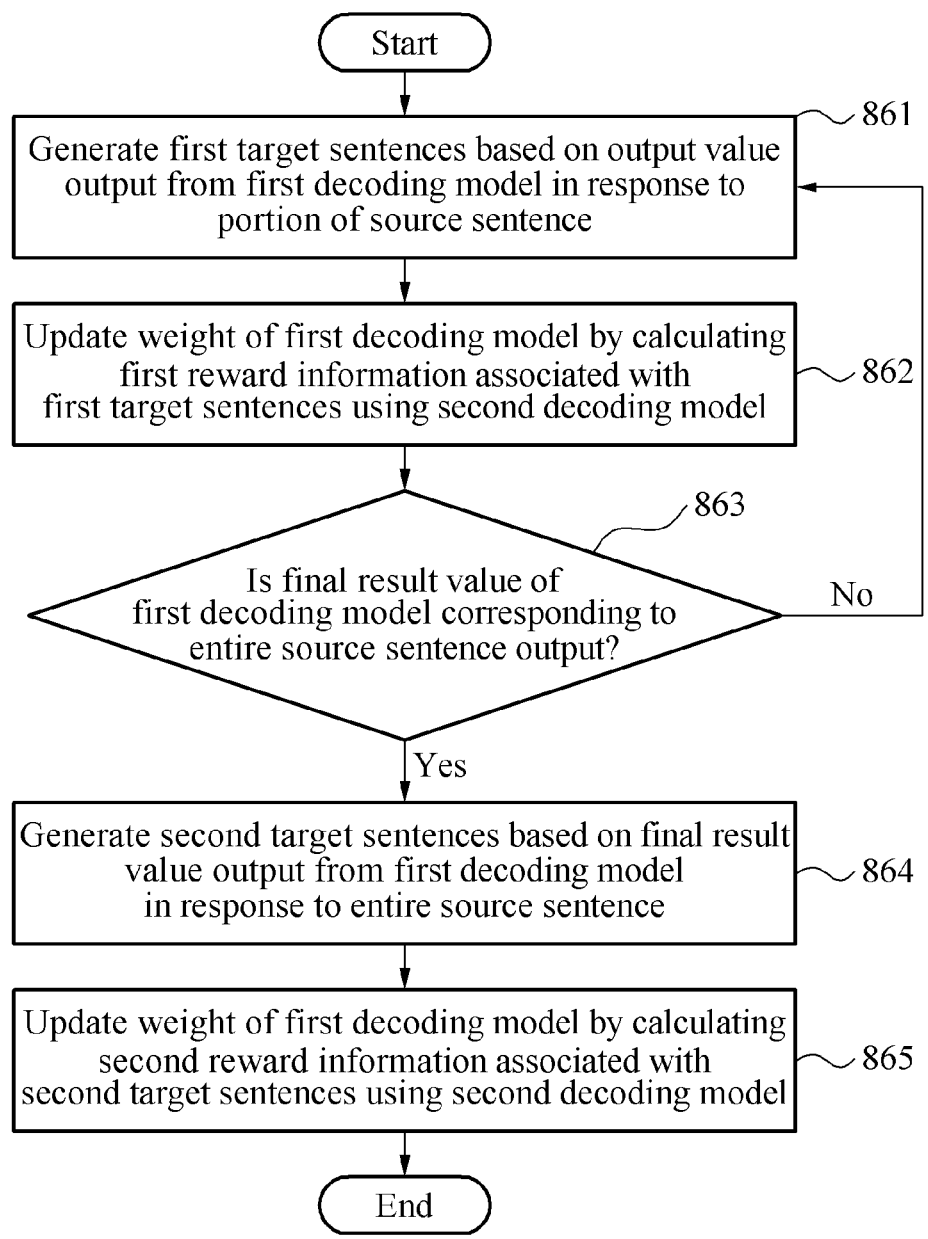
FIG. 8B is a flowchart illustrating an example of a method of generating a target sentence using an N-best algorithm and a Monte Carlo search algorithm together.

FIG. 8B is a flowchart illustrating an example of a method of generating, by the updating apparatus 800 of FIG. 8A, a target sentence using an N-best algorithm and a Monte Carlo search algorithm together. Referring to FIG. 8B, the method of generating a target sentence using an N-best algorithm and a Monte Carlo search algorithm together includes an operation 861 of generating first target sentences based on an output value output from a first decoding model in response to a portion of a source sentence, an operation 862 of updating a weight of the first decoding model by calculating first reward information associated with the first target sentences using a second decoding model, an operation 863 of verifying whether a final result value of the first decoding model corresponding to an entirety of the source sentence is output, an operation 864 of generating second target sentences based on the final result value output from the first decoding model in response to the entirety of the source sentence, and an operation 865 of updating the weight of the first decoding model by calculating second reward information associated with the second target sentences using the second decoding model.

In operation 861, the first target sentences are generated based on an intermediate output value output from the first decoding model, in response to a portion of the source sentence. For example, in operation 861, the first target sentences are generated by a Monte Carlo search sentence generator.

In operation 862, the first reward information associated with the first target sentences is calculated using the second decoding model. In addition, the weight of the first decoding model is updated based on the calculated first reward information.

In operation 863, it is determined whether the final result value of the first decoding model corresponding to the entirety of the source sentence is output. When the final result value of the first decoding model corresponding to the entirety of the source sentence is output, operation 864 is performed. Conversely, when the final result value of the first decoding model corresponding to the entirety of the source sentence is yet to be output, operation 861 is repeated. Operations 861 through 863 are repeated until it is determined in operation 863 that the final result value of the first decoding model corresponding to the entirety of the source sentence is output.

In operation 864, the second target sentences are generated based on the final result value output from the first decoding model in response to the entirety of the source sentence. For example, in operation 864, the second target sentences are generated by an N-best sentence generator.

In operation 865, the second reward information associated with the second target sentences is calculated using the second decoding model. In addition, a connection weight of the second decoding model is updated based on the calculated second reward information. As described above, the method may include updating a connection weight based on the Monte Carlo search sentence generator before a final result value of the first decoding model is output, and updating a connection weight based on the N-best sentence generator when the final result value is generated. Thus, the method may update, in real time, a connection weight of the first decoding model, and also match a learning or training method to a decoding method to improve an accuracy of generating target sentences.

Figure 9:
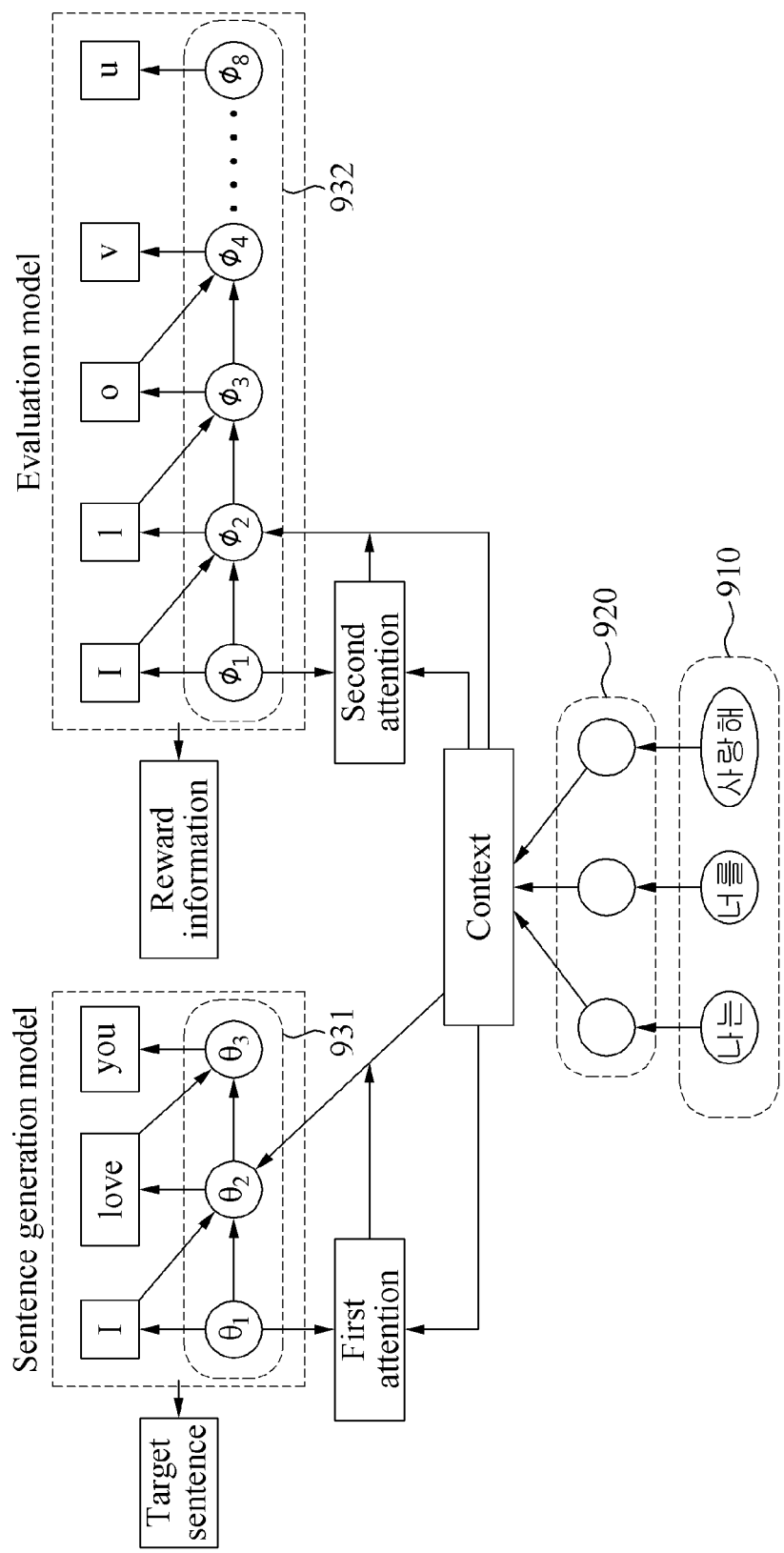
FIG. 9 is a diagram illustrating another example of a manner in which reward information associated with a target sentence is calculated.

FIG. 9 is a diagram illustrating another example of how reward information associated with a target sentence is calculated. More specifically, FIG. 9 illustrates another example of a sentence generation model and another example of an evaluation model configured to generate reward information associated with a generated target sentence. Although the illustrated example of the sentence generation model is embodied as a translation model in FIG. 9 for convenience of description, the scope of the disclosure is not limited to this example. The sentence generation model may be a language model of various types configured to generate a predetermined or specified target sentence corresponding to a given source sentence.

Referring to FIG. 9, the updating apparatus uses a first decoding model 931 as the sentence generation model. For example, the first decoding model 931 is a forward decoding model configured to perform decoding in a sequential order starting from a beginning of a target sentence to an end of the target sentence. As illustrated, a feature value of a source sentence 910 "나는 너를 사랑해" is input to the first decoding model 931 to generate a target sentence "I love you." Here, each of words "나는," "너를," and "사랑해" included in the source sentence 910 is input to a predetermined or specified encoding model 920, and the feature value is extracted. The feature value extracted from the source sentence 910 includes context information and first attention information. For detailed descriptions of the context information and the first attention information, reference may be made to the description provided above with reference to FIG. 5, and, thus, a more detailed and repeated description is omitted here for brevity and clarity.

The context information and the first attention information associated with the source sentence 910 are input to a node in the first decoding model 931. In this example, nodes in the first decoding model 931 are connected based on preset connection weights $\theta_1$, $\theta_2$, and $\theta_3$. The first decoding model 931 generates and outputs the target sentence based on the feature value of the source sentence 910 input to the first decoding model 931.

A second decoding model 932 is used as the evaluation model for the generated target sentence. For example, the second decoding model 932 is a character-based decoding model configured to perform decoding in a sequential order by predicting characters starting from a first character in the target sentence to a last character in the target sentence. Similarly, a feature value of the source sentence 910 "나는 너를 사랑해" is input to the second decoding model 932. The feature value extracted from the source sentence 910 includes the context information and second attention information. In this example, nodes in the second decoding model 932 are connected based on preset or specified connection weights $\Phi_1$ through $\Phi_8$. The second decoding model 932 generates reward information based on the feature value of the source sentence 910 and a probability that each of the characters included in the target sentence is generated. Using the reward information output from the second decoding model 932, connection weights of the nodes in the first decoding model 931 are newly reset.

As described herein, the updating apparatus may use various types of decoding models as the evaluation model to evaluate the sentence generation model. Thus, the updating apparatus may prevent the sentence generation model from being biased in one direction when being learned or trained.

Figure 10:
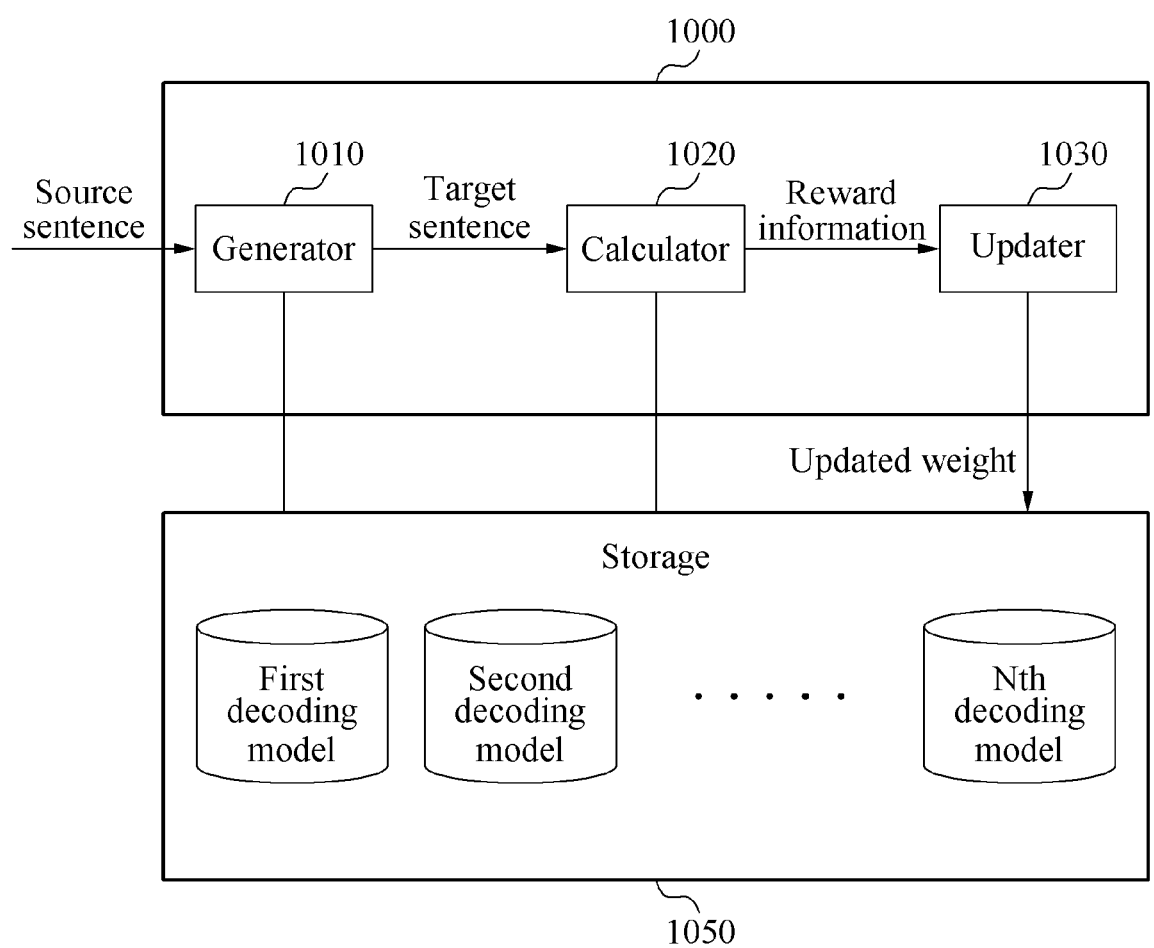
FIG. 10 is a diagram illustrating an example of a sentence generating apparatus.

FIG. 10 is a diagram illustrating an example of a sentence generating apparatus. Referring to FIG. 10, a sentence generating apparatus 1000 includes a generator 1010, a calculator 1020, and an updater 1030. The sentence generating apparatus 1000 used herein refers to an apparatus configured to output a target sentence corresponding to a source sentence input by a user. The sentence generating apparatus 1000 may be embedded in, for example, a mobile or cellular phone, a smartphone, a personal computer (PC), a laptop, a netbook, a tablet PC, a personal digital assistant (PDA), a digital camera, a game console, an MP3 player, a personal multimedia player (PMP), an e-book, a navigation system, a disc player, a set-top box, a home appliance, a communication device, a display device, and other electronic devices, or interwork with such devices. In addition, the sentence generating apparatus 1000 may be embedded in, for example, a smart home appliance, an intellectual vehicle, an autonomous driving vehicle, a smart home environment, a smart building environment, a smart office environment, and a smart electronic security system, or interwork with such devices, systems, or environments. In addition, the sentence generating apparatus 1000 may be included in a wearable device worn on or around a body of a user, or interwork with such a device. The wearable device may be provided in a form, for example, a ring, a watch, an eyeglasses, a bracelet, a belt, a band, a necklace, an earring, a helmet, clothes, and the like.

The generator 1010 may generate a target sentence corresponding to a source sentence using a first decoding model. The first decoding model may be a language model stored in a predetermined or specified storage 1050. In an example, a memory area in the sentence generating apparatus 1000 is used as the storage 1050. In another example, an external memory device connected to the sentence generating apparatus 1000 through an interface is used as the storage. A plurality of decoding models may be stored in the storage 1050. The decoding models may include language models of various types, such as a forward decoding model, a backward decoding model, and a character-based decoding model. Each of the decoding models may include an RNN or another type of neural network. The generator 1010 may select the first decoding model from the storage 1050, and generate the target sentence corresponding to the source sentence using the selected first decoding model.

In an example, the generator 1010 generates target sentences based on a final result value, among final result values output from the first decoding model in response to the source sentence, being in a preset range.

The calculator 1020 may calculate reward information associated with a target sentence, using a second decoding model. Similarly, the calculator 1020 may select the second decoding model from the storage 1050, and calculate the reward information associated with the target sentence using the selected second decoding model.

In an example, in a case in which the backward decoding model is selected by the calculator 1020, the calculator 1020 may calculate the reward information using a word sequence in which words included in the target sentence are arranged in an order different from an order of the target sentence. The calculator 1020 may calculate the reward information by calculating a probability that a second word is generated from the backward decoding model at a current time using the source sentence and a first word output from the backward decoding model at a previous time.

In another example, in a case in which the character-based decoding model is selected by the calculator 1020, the calculator 1020 may calculate the reward information using a word sequence in which characters included in each of the words in the target sentence are separated from each other. The calculator 1020 may calculate the reward information by calculating a probability that a second character is generated from the character-based decoding model at a current time using the source sentence and a first character output from the character-based decoding model at a previous time.

In still another example, the generator 1010 may generate target sentences based on an output value output from the first decoding model at a first time in response to a word in the source sentence. In such an example, the calculator 1020 may calculate reward information associated with the target sentences generated at the first time, using the second decoding model.

In yet another example, the generator 1010 generates first target sentences based on an output value output from the first decoding model in response to each of words included in the source sentence, and generates second target sentences based on a final result value, among final result values output from the first decoding model in response to an entirety of the source sentence, being in a preset range. In such an example, the calculator 1020 may calculate first reward information associated with the first target sentences and second reward information associated with the second target sentences, using the second decoding model. The updater 1030 may reset connection weights of nodes in the first decoding model based on the calculated reward information.

In further another example, the generator 1010 may generate a new target sentence corresponding to the source sentence using the second decoding model. The calculator 1020 may calculate reward information associated with the new target sentence using the first decoding model. The updater 1030 may reset connection weights of nodes in the second decoding model based on the calculated reward information.

The sentence generating apparatus 1000 may update itself a sentence generation model using a plurality of prestored decoding models as an evaluation model. The sentence generating apparatus 1000 may evaluate performances of the decoding models possessed by the sentence generating apparatus 1000 on a periodic basis, and reset connection weights of the decoding models on the periodic basis to generate a more accurate sentence.

Figure 11:
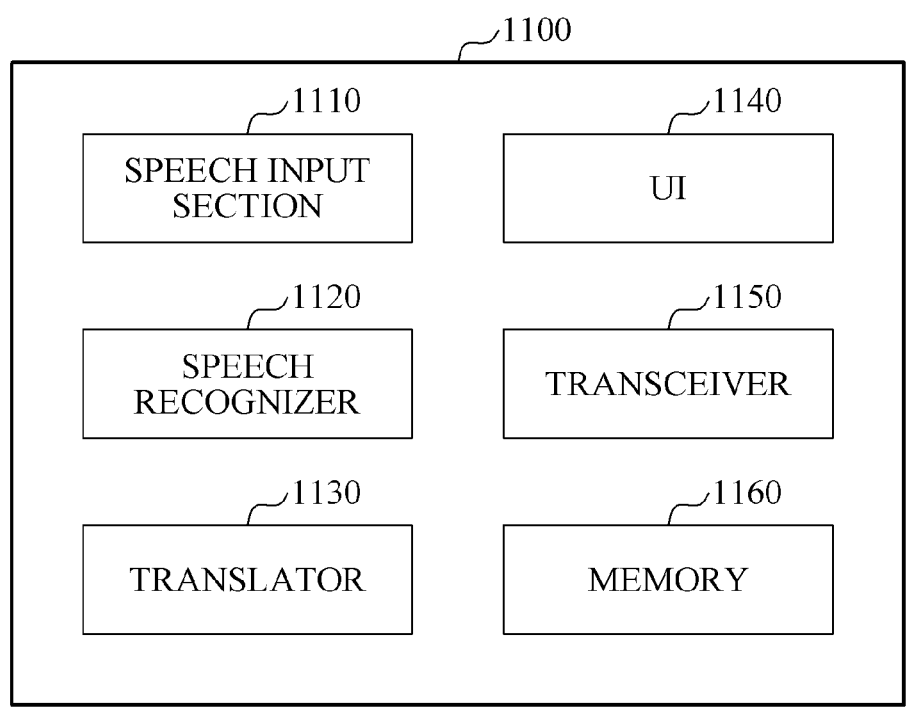
FIG. 11 is a diagram of an electronic device, according to an embodiment.

FIG. 11 is a block diagram of an example electronic device 1100.

Referring to FIG. 11, the electronic device 1100 may include a speech input section 1110, a speech recognizer 1120, and a translator 1130. For example, the speech input section 1110 may include a microphone, be operable in connection with or in response to such a microphone of the user interface (UI) 1140, or may be part of the UI 1140. The speech input section 1110 may additionally or alternatively include a camera or a memory storing captured image data of text information. In one or more embodiments, the speech recognizer 1120 may include one or more processors, for example. The speech recognizer 1120 may be understood by reference to any of the above embodiments, such that detailed description thereof will be omitted.

The speech input section 1110 may receive a user's audio signal that is input through the microphone. In one or more embodiments, the user's audio signal may be related to sentences to be translated into another language or commands for controlling a TV set, driving a vehicle, intelligent speech/conversation, or the like and only as examples.

Thus, one or more acoustic and/or language models of the speech recognizer 1120 may be respectively trained and used to model different languages. In an example, the speech recognizer 1120 may also convert an analog audio signal input to the speech input section 1110 by a user into a digital signal, and may divide the signal into a plurality of speech frames. The speech recognizer 1120 may output a speech recognition result in a text format, e.g., as the source sentence, by recognizing a user's speech by using the acoustic and language scores obtained by the respective acoustic and language models implemented by the speech recognizer 1120.

The translator 1130 may correspond to the updating apparatus 100 of FIG. 1, the updating apparatus 600 of FIG. 6, the updating apparatus 700 of FIG. 7, the updating apparatus 800 of FIG. 8, or the sentence generating apparatus 1000 of FIG. 10, for example, and may perform any of the above operations described with respect to updating the sentence generation model. In addition, the translator 1130 may perform reward information calculating operations of FIG. 3A, policy information calculating operations of FIG. 3B, connection weight resetting operations of FIGS. 4A and 4B, and target sentence generation and decoding model updating operations of FIG. 8B.

In addition, the translator 1130 may generate a translation of the source sentence and indicate a result of the translation, either explicitly or implicitly, such as by outputting a translated sentence, or by performing an operation desired by a user or an answer to a query in response to the translation result. For example, the translator 1130 may output the recognition result of speech input by a user in voice through a speaker represented by the UI 1140 and the like, or may provide the recognition result in a text format on a display represented by the UI 1140. Further, the translator 1130 may perform operations to process commands (e.g., power on/off, volume control, etc.) regarding the electronic apparatus 1100. In addition, the translator 1130 may execute applications installed in the electronic device 1100, operate a web browser to browse a website desired by a user, provide results of a translated query. Thus, the translator 1130 may translate the speech recognition result into another language, and may output a translated result in voice or in a text format, or perform or not perform further operations based on the results of the translation. However, the translator 1130 is not limited thereto, and may be used in other various applications.

The electronic device 1100 may be a mobile terminal and/or wearable device. Such a mobile terminal or wearable device has user input and output hardware in the UI 1140, representative of a microphone, display/touch screen, physical buttons, speaker, vibration motor, camera, e.g., inter-coupled via a communication bus to one or more processors of the electronic device 1100 and a memory, such as memory 1160. The disclosed examples and operations of FIGS. 1-10 may also be especially useful in wearable devices which generally do not have physical keyboards and only limited display area for user text/command entry, though embodiments may alternatively exist where the UI 1140 includes such a physical keyboard and display(s).

Still further, the memory 1160 may be used to store one or more generated acoustic and/or language models, to be used by the speech recognizer 1120, as well as one or more of the decoding models used and updated by the translator 1130. Alternatively, acoustic and/or language models and the decoding models may be stored remotely, and the translator 1130 may send information to these models and receive information from these models through a transceiver 1150.

Thus, as a non-exhaustive example only, the electronic device 1100 as described herein may be a mobile device, such as a cellular phone, a smart phone, a wearable smart device (such as a ring, a watch, a pair of glasses, a healthcare device, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, other healthcare device, a mobile robot, a vehicle electronic device, user interface, or controller, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The updating apparatus 100, the generator 110, the calculator 120, and the updater 130 in FIG. 1, the updating apparatus 600, the N-best sentence generator 610, the calculator 620, and the updater 630 in FIG. 6, the updating apparatus 700, the Monte Carlo search sentence generator 710, the calculator 720, and the updater 730 in FIG. 7, the updating apparatus 800, the Monte Carlo search sentence generator 810, the N-best sentence generator 820, the calculator 830, and the updater 840 in FIG. 8, the sentence generating apparatus 1000, the generator 1010, the calculator 1020, the updater 1030, and the storage 1100 in FIG. 10, and the speech input section 1110, the speech recognizer 1120, the translator 1130, the UI 1140, the transceiver 1150, and the memory 1160 in FIG. 11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3A and 3B, 4A and 4B, and 8B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method, comprising:
generating, using a first decoding model, a target sentence corresponding to a source sentence;
generating, using a second decoding model, words included in another target sentence in an order different from a generated word order of the words as also included in the target sentence;
generating, using the second decoding model, reward information associated with the target sentence and the words; and
training, based on the reward information, an updated sentence generation model, including resetting respective weights of nodes in the first decoding model,
wherein the first decoding model, second decoding model, and sentence generation model are machine learning models.

2. The method of claim 1, wherein the generating of the reward information comprises generating the reward information based on a probability that each of plural words included in the target sentence is generated from the second decoding model.

3. The method of claim 2, wherein the generating of the reward information further comprises
generating, based on the source sentence and a first word output from the second decoding model at a previous time, a probability that a second word is generated from the second decoding model at a current time.

4. The method of claim 2, wherein the generating of the reward information further comprises generating the reward information based on a word sequence in which the plural words included in the target sentence are arranged in an order different from an order of the plural words in the target sentence.

5. The method of claim 1, wherein
the first decoding model is a forward decoding model comprising a recurrent neural network (RNN), and
the second decoding model is a backward decoding model comprising another RNN.

6. The method of claim 1, wherein the resetting of the respective weights comprises
generating, using the first decoding model, policy information associated with the target sentence, and
resetting the respective weights based on the respective weights corresponding to a specified condition, using the generated policy information and the generated reward information.

7. The method of claim 6, wherein the generating of the policy information comprises generating the policy information based on a probability that each of plural words included in the target sentence is generated from the first decoding model.

8. The method of claim 7, wherein the generating of the policy information further comprises generating, based on the source sentence and a first word output from the first decoding model at a previous time, a probability that a second word is generated from the first decoding model at a current time.

9. The method of claim 6, wherein
the resetting of the respective weights further comprises resetting weights that maximize an objective function defined by reward information and policy information associated with each of target sentences, and
the target sentences are generated from the source sentence using the first decoding model.

10. The method of claim 6, wherein
the resetting of the respective weights further comprises resetting weights that minimize a loss function defined by an objective function and a probability that a predetermined correct sentence for the source sentence is generated from the first decoding model, and
target sentences are generated from the source sentence using the first decoding model, and the objective function is defined by reward information and policy information associated with each of the target sentences.

11. The method of claim 1, wherein the generating of the target sentence comprises generating target sentences in response to a final result value, among final result values output from the first decoding model in response to the source sentence, being in a specified range.

12. The method of claim 1, wherein
the generating of the target sentence comprises generating target sentences based on an output value output from the first decoding model at a first time in response to a word in the source sentence, and
the generating of the reward information comprises generating, using the second decoding model, reward information associated with the target sentences generated at the first time.

13. The method of claim 1, wherein
the generating of the target sentence comprises generating a specified number of target sentences by sampling an output value output from the first decoding model at a first time in response to a word in the source sentence, and
the generating of the reward information comprises generating, using the second decoding model, reward information associated with the specified number of target sentences.

14. The method of claim 1, wherein the generating of the target sentence comprises:
generating first target sentences based on an output value output from the first decoding model in response to each of plural words included in the source sentence; and
generating second target sentences in response to a final result value, among final result values output from the first decoding model in response to an entirety of the source sentence, being in a specified range.

15. The method of claim 14, wherein the generating of the reward information comprises:
generating, using the second decoding model, first reward information associated with the first target sentences; and
generating, using the second decoding model, second reward information associated with the second target sentences.

16. The method of claim 1, further comprising:
generating, using the second decoding model, the another target sentence corresponding to the source sentence;
generating, using the first decoding model, reward information associated with the another target sentence; and
resetting a weight of each of nodes in the second decoding model based on the generated reward information.

17. A non-transitory computer-readable storage medium storing instructions that, when executed by a processor, cause the processor to perform the method of claim 1.

18. A sentence generating apparatus, comprising:
one or more processors configured to:
generate, using a first decoding model, a target sentence corresponding to a source sentence;
generate, using a second decoding model, words included in another target sentence in an order different from a generated word order of the words as also included in the target sentence;
generate, using the second decoding model, reward information associated with the target sentence and the words; and
train, based on the generated reward information, an updated sentence generation model, including resetting respective weights of nodes in the first decoding model,
wherein the first decoding model, second decoding model, and sentence generation model are machine learning models.

19. The sentence generating apparatus of claim 18, wherein the one or more processors is further configured to generate the reward information based on a word sequence in which plural words included in the target sentence are arranged in an order different from an order of the plural words in the target sentence.

20. The sentence generating apparatus of claim 19, wherein the one or more processors is further configured to calculate the reward information by generating, based on the source sentence and a first word output from the second decoding model at a previous time, a probability that a second word is generated from the second decoding model at a current time.

21. The sentence generating apparatus of claim 18, wherein the one or more processors is further configured to generate the reward information by inputting, to the second decoding model, a word sequence in which characters included in each of plural words included in the target sentence are separated.

22. The sentence generating apparatus of claim 21, wherein the one or more processors is further configured to calculate, based on the source sentence and a first character output from the second decoding model at a previous time, the reward information by generating a probability that a second character is generated from the second decoding model at a current time.

23. The sentence generating apparatus of claim 21, wherein the one or more processors is further configured to generate target sentences in response to a final result value, among final result values output from the first decoding model in response to the source sentence, being in a specified range.

24. The sentence generating apparatus of claim 21, wherein the one or more processors is further configured to:
generate target sentences based on an output value output from the first decoding model at a first time in response to a word in the source sentence; and
generate reward information associated with the target sentences generated at the first time using the second decoding model.

25. The sentence generating apparatus of claim 21, wherein the one or more processors is further configured to:
generate first target sentences based on an output value output from the first decoding model in response to each of plural words in the source sentence; and
generate second target sentences in response to a final result value, among final result values output from the first decoding model in response to an entirety of the source sentence, being in a specified range.

26. The sentence generating apparatus of claim 25, wherein the one or more processors is further configured to:
generate, using the second decoding model, first reward information associated with the first target sentences; and
generate, using the second decoding model, second reward information associated with the second target sentences.

27. The sentence generating apparatus of claim 21, wherein the one or more processors is further configured to:
generate, using the second decoding model, the another target sentence corresponding to the source sentence;
generate, using the first decoding model, reward information associated with the another target sentence; and
reset respective weights of nodes in the second decoding model based on the generated reward information.

* * * * *